(12) United States Patent
Watanabe et al.

(10) Patent No.: US 9,857,264 B2
(45) Date of Patent: Jan. 2, 2018

(54) LEAK TESTING APPARATUS AND METHOD

(71) Applicant: Fukuda Co., Ltd., Tokyo (JP)

(72) Inventors: Takaaki Watanabe, Tokyo (JP); Tsutomu Hara, Tokyo (JP); Naohiko Maruno, Tokyo (JP)

(73) Assignee: Fukuda Co., Ltd., Tokyo (JP)

( * ) Notice: Subject to any disclaimer, the term of this patent is extended or adjusted under 35 U.S.C. 154(b) by 167 days.

(21) Appl. No.: 14/909,768

(22) PCT Filed: Oct. 14, 2014

(86) PCT No.: PCT/JP2014/077285
§ 371 (c)(1),
(2) Date: Feb. 3, 2016

(87) PCT Pub. No.: WO2015/056661
PCT Pub. Date: Apr. 23, 2015

(65) Prior Publication Data
US 2016/0178472 A1 Jun. 23, 2016

(30) Foreign Application Priority Data

Oct. 15, 2013 (JP) ................. 2013-214556

(51) Int. Cl.
*G01M 3/20* (2006.01)
*G01M 3/22* (2006.01)
*G01M 3/32* (2006.01)

(52) U.S. Cl.
CPC ............. *G01M 3/20* (2013.01); *G01M 3/202* (2013.01); *G01M 3/226* (2013.01); *G01M 3/229* (2013.01); *G01M 3/3272* (2013.01)

(58) Field of Classification Search
CPC ........ G01M 3/20; G01M 3/202; G01M 3/226; G01M 3/229
(Continued)

(56) References Cited

U.S. PATENT DOCUMENTS 3,578,758 A * 5/1971 Altshuler .............. G01M 3/202
250/430
4,608,866 A * 9/1986 Bergquist .............. G01M 3/202
62/55.5
(Continued)

FOREIGN PATENT DOCUMENTS

JP 2002098611 A 4/2002
JP 2002228539 A 8/2002
(Continued)

OTHER PUBLICATIONS

International Search Report of corresponding PCT Application No. PCT/JP2014/077285 (English version).

*Primary Examiner* — Peter Macchiarolo
*Assistant Examiner* — Nathaniel Kolb
(74) *Attorney, Agent, or Firm* — Thomas B. Ryan; Harter Secrest & Emery LLP

(57) ABSTRACT

In leak testing by an accumulation method, it is possible to reliably detect accumulated inspection gas, and the reliability of leak testing is enhanced by reduction in background or impurity gas. At least an openable/closeable part 29 of a capsule 20 is housed inside a chamber 10 of a leak testing apparatus 1. A test workpiece 9 is housed in the capsule 20. Gas inside the chamber 10 is evacuated by a vacuum pump 31. A detector 2 detects inspection gas contained in this gas. The capsule 20 is continuously sealed for an accumulation time Ta, the capsule 20 is thereafter opened, and a leak is evaluated on the basis of detection information after the opening by the detector 2.

20 Claims, 17 Drawing Sheets

(58) Field of Classification Search
USPC .................................................. 73/40, 40.7
See application file for complete search history.

(56) References Cited

U.S. PATENT DOCUMENTS

| | | | | |
|---|---|---|---|---|
| 7,707,871 B2* | 5/2010 | Lukens | ................. | G01M 3/229 |
| | | | | 73/40.7 |
| 2004/0003653 A1* | 1/2004 | Avila | .................... | G01M 3/205 |
| | | | | 73/40.7 |
| 2005/0223779 A1* | 10/2005 | Perkins | ................. | G01M 3/202 |
| | | | | 73/40.7 |
| 2009/0173144 A1* | 7/2009 | Lukens | ................. | G01M 3/229 |
| | | | | 73/40.7 |
| 2012/0260722 A1* | 10/2012 | McGregor | ............ | G01M 3/207 |
| | | | | 73/40.7 |

FOREIGN PATENT DOCUMENTS

| | | |
|---|---|---|
| JP | 2007501946 A | 2/2007 |
| JP | 2007278914 | 10/2007 |

\* cited by examiner

LEAK TESTING APPARATUS AND METHOD

TECHNICAL FIELD

The present invention relates to a leak testing apparatus and a leak testing method for testing airtightness of a test workpiece having an internal space, and more particularly to a leak testing apparatus and a leak testing method, each of which is optimized for minute leak testing by accumulating inspection gas such as helium that leaks from the test workpiece, and then detecting the accumulated inspection gas.

BACKGROUND ART

Leak testing is known as a technology of examining airtightness of a test workpiece having an internal space. Particularly, in a case where the test workpiece is a micro-sized electronic component such as a quartz oscillator and an MEMS (Micro Electro Mechanical Systems), a dipping method (bombing method) is employed in order to enhance sensitivity (refer to JIS Z 2331 (2006), JIS C 60068-2-17, Patent Literature 1, and the like). As described in Patent Literature 1, in the dipping method, the test workpiece is put into a bombing tank, and is allowed to stand until a desirable bombing time elapses, in a state where the inside of the bombing tank is pressurized by helium gas (inspection gas). At this time, in a test workpiece having good airtightness, helium does not enter at all or scarcely enters the inside of the test workpiece. On the other hand, in a test workpiece having a defect in airtightness, helium enters the inside of the test workpiece through the defect part. When the bombing time elapses, the test workpiece is taken out from the bombing tank to be put into a vacuum chamber. Gas in this vacuum chamber is evacuated, and helium in this exhaust is detected. In a case where the airtightness of the test workpiece is good, a detected flow rate of helium is limited to a level equivalent to the background. On the other hand, in a case where the airtightness of the test workpiece is failure, helium that enters in bombing leaks, so that helium that largely exceeds the background is detected. Consequently, it is possible to determine the quality of the airtightness of the test workpiece.

Recently, in the micro-sized electronic component such as the quartz oscillator and the MEMS, the request level of the airtightness becomes more severe, and further improvement of detection sensitivity for leaked helium is requested. As one of the methods, a so-called accumulation method is proposed (e.g., Patent Literature 2). In the accumulation method, leaked helium from a test workpiece is accumulated in a chamber for a predetermined accumulation time, and helium partial pressure is increased, and thereafter detection is performed. Therefore, it is possible to reliably perform detection even when the leak is minute.

CITATION LIST

Patent Literature

Patent Literature 1: Japanese Patent Laid-Open No. 2007-278914
Patent Literature 2: Japanese Patent Laid-Open No. 2002-098611

SUMMARY OF INVENTION

Technical Problem

In the accumulation method of Patent Literature 2, there is a possibility that helium and moisture are adsorbed to an inner wall of the chamber. During an accumulation process, when this adsorbed helium and the like are desorbed, the desorbed helium and the like are accumulated in the chamber, as background and impurity gas. Additionally, helium in outside air sometimes permeates a seal member of a taking-in/out door of the test workpiece, or the like to enter the chamber, and is accumulated. The amount of the helium that permeates this seal member or the like to enter is minute, but quantitatively unstable, and there is no guarantee that the permeation of helium stops even when gas is exhausted for a long time.

When the chamber is downsized, the surface area of the inner wall of the chamber is reduced, and therefore it is possible to reduce an adsorption amount and thus a desorption amount of the helium that becomes the background and impurity gas to the chamber inner wall. However, in a case where the inner capacity of the chamber is excessively small, when the chamber is communicated with a vacuum pump after the accumulation, the accumulated helium is instantaneously exhausted, and cannot be detected. Particularly, in Patent Literature 2, a leak flow rate is calculated by using a maximum peak value of helium detection or the like, but when exhaust is too fast, identification of the peak becomes difficult, and the leak flow rate cannot be calculated.

On the other hand, when the inner capacity of the chamber is increased, an exhaust time necessary for the detection can be ensured. However, the surface area of the inner wall of the chamber is increased, and therefore the adsorption amount and thus the desorption amount of background helium and impurity gas are increased by the increased inner capacity, and a ratio of the background and impurity gas to the accumulated gas is increased.

The present invention has been made in view of the above circumstances, and an object of the present invention is to enhance the reliability of the leak testing by enabling reliable detection of accumulated inspection gas and by reducing background and impurity gas in leak testing by an accumulation method.

Solution to Problem

In order to solve the above problem, the apparatus of the present invention is a leak testing apparatus for testing a leak of inspection gas from a test workpiece having an internal space, the leak testing apparatus comprising:

a capsule that has an openable/closeable part, and houses the test workpiece;

a chamber that has a larger inner capacity than an inner capacity of the capsule, and houses at least the openable/closeable part of the capsule;

a vacuum pump that evacuates gas inside the chamber;

a detector that detects the inspection gas from the chamber or the inspection gas in the chamber;

a capsule opener/closer that closes the openable/closeable part at a certain stage of the evacuation to continuously seal the capsule for an accumulation time, and opens the openable/closeable part to open inside of the capsule to inside of the chamber after the accumulation time elapses; and an evaluator that evaluates the leak on the basis of detection information by the detector.

According to this characteristic configuration, leaked gas from the test workpiece is accumulated in the sealed capsule during the accumulation time, and the capsule is thereafter opened, so that the accumulated leaked gas can be released to the chamber to be detected. Consequently, it is possible to enhance sensitivity to a minute leak. In addition, the inner capacity of the capsule is made to be smaller than the inner capacity of the chamber, so that it is possible to reduce background and impurity gas originated from the inside of the capsule. Furthermore, it is possible to continue to exhaust or remove the gas inside the chamber during the accumulation time. This enables reduction in background and impurity gas originated from a place other than the inside of the capsule (outside the capsule). As a result, it is possible to enhance the reliability of leak testing.

Herein, "evaluation of a leak" includes the determination of the quality of the airtightness of the test workpiece, the quantification of the level of the leak of the test workpiece, the calculation of a leak amount, the display of the leak amount, and the like.

The detector may detect the flow rate of inspection gas contained in gas vacuum-sucked from the chamber, or may detect the partial pressure of the inspection gas in the chamber.

The inner capacity of the chamber is preferably at least 5 times the inner capacity of the capsule, is more preferably at least 100 times the inner capacity of the capsule, and is further more preferably at least 1000 times the inner capacity of the capsule. In other words, the inner capacity of the capsule is preferably at most one-fifth times (0.2 times) the inner capacity of the chamber, is more preferably at most one hundredth times (0.01 times) the inner capacity of the chamber, and is further more preferably at most one thousandth times (0.001 times) the inner capacity of the chamber. Consequently, while the chamber size for obtaining a (evacuation) time constant suitable for measuring the accumulated inspection gas is ensured, the surface area of the inner wall of the capsule related to the accumulation of the inspection gas is made to be preferably at most approximately 0.35 times the surface area of the inner wall of the chamber, is more preferably at most approximately twentieth part times (0.05 times) the surface area of the inner wall of the chamber, and is further more preferably at most approximately one hundredth times (0.01 times) the surface area of the inner wall of the chamber, so that it is possible to reliably reduce background and impurity gas originated from the inside of the capsule which are accumulated along with the inspection gas.

The detector preferably detects a flow rate of the inspection gas contained in the evacuated gas, and the evaluator preferably calculates a time integration amount of a detected flow rate by the detector in a measurement time after the opening. A time constant of the evacuation is preferably not less than 0.1 seconds and not more than 1 second.

In a case of the test workpiece having a leak, leaked gas is accumulated in the capsule during the accumulation time. Thereafter, the accumulated leaked gas is evacuated along with the gas inside the chamber by the opening of the capsule, so that a detected flow rate by the detector increases. The container (capsule) for accumulating the leaked gas and the container (chamber) for determining the evacuation time constant are separately provided, so that the inner capacity of the chamber is made to be larger than the inner capacity of the capsule, the time constant can be made to be a proper value, the gas accumulated in the capsule during the accumulation time can be reliably detected by the detector after the opening of the capsule. The time integration amount should contribute to the evaluation of the leak, and arithmetic operation process may be further performed to the time integration amount to calculate an index for the leak evaluation, or the time integration amount may be made to be a final index for the leak evaluation. Furthermore, the gas inside the chamber can continue to exhaust during the accumulation time. This enables reduction in background and impurity gas originated from the place other than the inside of the capsule (outside the capsule). As a result, it is possible to further enhance the reliability of the leak testing.

The evaluator preferably estimates an amount of inspection gas originated from a place other than the inside of the capsule, which is included in the time integration amount, from a detected flow rate in the accumulation time by the detector, and evaluates the leak on the basis of an amount of inspection gas originated from the inside of the capsule, which is obtained by deducting the estimated gas amount from the time integration amount, and a flow rate of the inspection gas originated from the inside of the capsule, which is calculated from the accumulation time and the measurement time. Consequently, it is possible that the index of the leak evaluation does not include the background originated from the outside of the capsule during the measurement time, and it is possible to omit the above background to evaluate the leak. It is possible to further accurately obtain the flow rate of the inspection gas originated from the inside of the capsule on the basis of not only the amount of the inspection gas originated from the inside of the capsule and the accumulation time but also the measurement time.

The chamber is preferably provided with a partition that is displaceable between a block position for partitioning the inside of the chamber into a first chamber and a second chamber larger than the first chamber, and a communication position for communicating the first and second chambers, the first chamber preferably houses the capsule, and the second chamber is preferably continued to the vacuum pump, and the partition is preferably put at the block position when the test workpiece is taken in/out and the partition is preferably put at the communication position in the accumulation time and the measurement time.

Consequently, it is possible to exchange the test workpiece by placing only the vicinity of the capsule in atmosphere. It is possible that atmosphere or the like does not enter the second chamber, and it is possible to prevent increase in background and impurity gas inside the chamber. Furthermore, it is possible to continuously evacuate the second chamber when the test workpiece is taken in/out, and it is possible to further reduce background and impurity gas inside the second chamber.

The evacuation of the chamber by the vacuum pump may be stopped during the opening, the detector may detect partial pressure of the inspection gas, and the evaluator may evaluate the leak on the basis of a degree of a change in the partial pressure with the opening.

In a case of the test workpiece having a leak, leaked gas is accumulated in the capsule during the accumulation time. The inner capacity of the capsule is made to be smaller than the inner capacity of the chamber, so that it is possible to reduce the background and impurity gas originated from the inside of the capsule. Thereafter, when the capsule is opened, the accumulated leaked gas is released to the chamber, so that the detected partial pressure of the inspection gas by the detector largely increases. In a case of the test workpiece having no leak, the degree of the increase/decrease of the detected partial pressure is small. Consequently, it is possible to highly sensitively detect the leak. The evacuation of the chamber by the vacuum pump is stopped when at least the capsule is opened, so that it is possible to reliably detect a change in the partial pressure of the inspection gas with the opening of the capsule.

At the start of the accumulation time or in the middle of the accumulation time, the evacuation of the chamber by the vacuum pump may be stopped. Furthermore, the apparatus may include a cryopump, and gas other than the inspection gas inside the chamber may be removed by the cryopump. Consequently, it is possible to remove impurity gas and the like in the chamber, and to enhance the detection precision of the partial pressure of the inspection gas by the detector.

The leak testing apparatus preferably further includes a monitor that monitors internal pressure of the capsule. When the capsule is sealed, impurity gas and the like that comes out from the inner wall of the capsule and the outer surface of the test workpiece raises the internal pressure of the capsule. Therefore, the internal pressure of the capsule is monitored, so that it is possible to determine whether or not the capsule is reliably sealed.

The leak testing apparatus may include a collection capsule having a plurality of recesses, and an openable/closeable part of the recesses, each of the plurality of recesses configuring the internal space of the capsule, wherein at least the openable/closeable part of the collection capsule may be housed inside the chamber. Consequently, the accumulation is performed at the same time, and therefore it is possible to increase the number that can be tested per unit time. As the openable/closeable part, for example, a covering sheet such as aluminum foil may be used. When the capsule inner chamber is sealed by the covering sheet, the covering sheet is swollen by gas generated from the inner wall of the capsule inner chamber and the outer surface of the test workpiece. The presence or absence of this swelling is observed by a sensor, so that it is possible to determine the quality of the sealing condition of each capsule inner chamber. The sensor functions as a monitor that indirectly determines the internal pressure of the capsule inner chamber by determining the swell of the covering sheet.

Additionally, the method of the present invention is a leak testing method for testing a leak of inspection gas from a test workpiece having an internal space, the leak testing method including the steps of:

housing the test workpiece in a capsule having an openable/closeable part;

housing at least the openable/closeable part of the capsule in a chamber having a larger inner capacity than an inner capacity of the capsule;

evacuating gas inside the chamber by a vacuum pump;

detecting the inspection gas from the chamber or the inspection gas in the chamber by a detector;

closing the openable/closeable part at a certain stage of the evacuation to continuously seal the capsule for an accumulation time;

opening the openable/closeable part to open inside of the capsule to inside of the chamber after the accumulation time elapses; and evaluating the leak on the basis of detection information by the detector.

According to this leak testing method, leaked gas from the test workpiece is accumulated in the sealed capsule during the accumulation time, and the capsule is thereafter opened, so that the accumulated leaked gas can be released to the chamber to be detected. Consequently, it is possible to enhance sensitivity to a minute leak. In addition, the inner capacity of the capsule is made to be smaller than the inner capacity of the chamber, so that it is possible to reduce background and impurity gas originated from the inside of the capsule. As a result, it is possible to enhance the reliability of leak testing.

The step of detecting preferably includes detecting a flow rate of the inspection gas contained in the evacuated gas by the detector, the method preferably further includes the step of calculating a time integration amount of the detected flow rate by the detector in a measurement time after the opening, and the step of evaluating preferably includes evaluating the leak on the basis of the time integration amount. Consequently, it is possible to reliably detect the accumulated gas, and to enhance the reliability of the leak testing.

The method preferably further includes the step of estimating an amount of inspection gas originated from a place other than the inside of the capsule, which is included in the time integration amount from a detected flow rate by the detector in the accumulation time, and the step of evaluating preferably includes evaluating the leak on the basis of an amount of inspection gas originated from the inside of the capsule, which is obtained by deducting the estimated gas amount from the time integration amount, and a flow rate of the inspection gas originated from the inside of the capsule, which is calculated from the accumulation time and the measurement time. Consequently, it is possible to evaluate the leak after the background originated from the outside of the capsule during the measurement time is removed, and it is possible to further accurately calculate the flow rate of the inspection gas originated from the inside of the capsule.

A time constant of the evacuation of the inspection gas is preferably not less than 0.1 seconds and not more than 1 second. Consequently, the gas accumulated in the capsule during the accumulation time can be reliably detected for a short time after the accumulation time elapses.

The measurement time is preferably at least 3 times and at most 6 times the time constant of the evacuation of the inspection gas. Consequently, it is possible to obtain the time integration amount corresponding to the almost total amount of the gas accumulated in the capsule during the accumulation time.

The method preferably further includes the step of stopping the evacuation of the chamber by the vacuum pump during the opening, the step of detecting preferably includes detecting partial pressure of the inspection gas in the chamber by the detector, and the step of evaluating preferably includes evaluating the leak on the basis of a degree of a change in the partial pressure with the opening.

Consequently, it is possible to highly sensitively detect the leak, and to enhance the reliability of the leak testing.

The method may include the step of stopping evacuating of the chamber by the vacuum pump at the start of the accumulation time or in the middle of the accumulation time. Furthermore, the method may include the step of removing gas other than the inspection gas inside the chamber by a cryopump.

The method preferably further includes the step of monitoring a sealing condition of the capsule by internal pressure of the capsule in the accumulation time. When the capsule is sealed, impurity gas and the like that come out from the inner wall of the capsule and the outer surface of the test workpiece raises the internal pressure of the capsule. Therefore, the internal pressure of the capsule is monitored, so that it is possible to determine whether or not the capsule is reliably sealed.

Advantageous Effects of Invention

According to the present invention, in the leak testing by the accumulation method, it is possible to reliably detect the accumulated gas, and to enhance the reliability of the leak testing.

DESCRIPTION OF EMBODIMENTS

Hereinafter, embodiments of the present invention will be described with reference to the drawings.

FIG. 1 to FIG. 4 each illustrate a first embodiment of the present invention. A test workpiece 9 of the embodiment is a micro-sized electronic component such as a quartz oscillator and an MEMS, and a major axis or a size on a long side of the test workpiece is, for example, about 1 mm to about 10 mm. The test workpiece of the present invention is not limited to the above. The test workpiece 9 has a sealed internal space 9a.

A leak testing apparatus 1 tests the leak of the above test workpiece 9. More specifically, the leak testing apparatus 1 detects the leak of inspection gas from the internal space 9a after bombing (immersion) of the inspection gas, and determines the quality of the airtightness of the test workpiece 9. As the inspection gas, helium (He) is used. The level of the leak to be tested is, for example, $10^{-6}$ Pa m$^3$/s to $10^{-17}$ Pa m$^3$/s, and particularly, an ultra-minute leak of $10^{-9}$ Pa m$^3$/s to $10^{-17}$ Pa m$^3$/s is the level to be tested.

Figure 1:
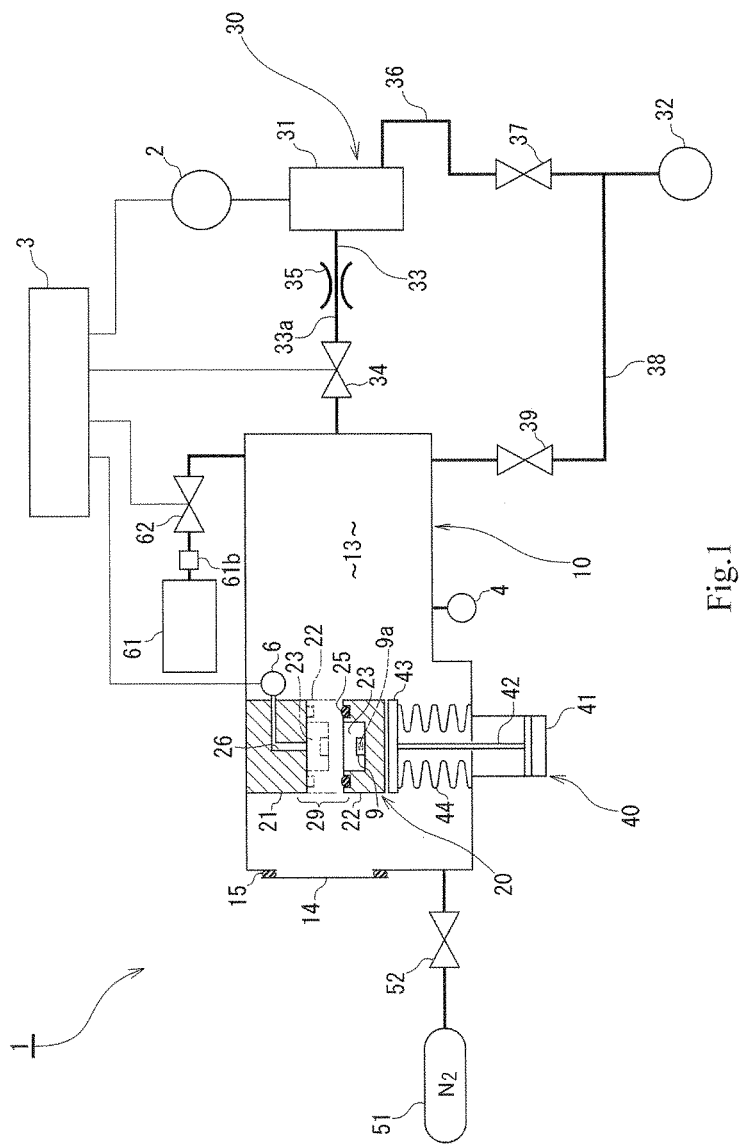
FIG. 1 is a circuit diagram illustrating a schematic configuration of a leak testing apparatus according to a first embodiment of the present invention.

As illustrated in FIG. 1, the leak testing apparatus 1 includes a chamber 10, a capsule 20, an evacuator 30, and a capsule opener/closer 40.

The chamber 10 has larger inner capacity than the capsule 20. Conversely, the inner capacity of capsule 20 is smaller than the inner capacity of the chamber 10. The inner capacity of the chamber 10 in this embodiment is preferably at least 100 times the inner capacity of the capsule 20, and is more preferably at least 1000 times the inner capacity of the capsule 20. Herein, the suitable minimum value (100 times) of the above inner capacity ratio is a ratio between the minimum value (e.g., 100 mL) of the inner capacity of the chamber 10 and the maximum value (e.g., approximately 1 mL) of the inner capacity of the capsule 20, which will be described later. The larger this ratio is (the smaller the capsule is), the smaller the amount of accumulated background helium and impurity gas can be, and it is possible to improve precision of leak inspection gas flow rate evaluation from the test workpiece 9.

It is considered that the suitable maximum value of the inner capacity ratio between the chamber 10 and the capsule 20 is, for example, about 100000 times from the ratio between the maximum value (e.g., 1000 mL) of the inner capacity of the chamber 10 and the minimum value (e.g., 0.01 mL) of the inner capacity of the capsule 20, which will be described later. The chamber 10 is provided with a taking-in/out door 14. The taking-in/out door 14 is opened, so that the test workpiece 9 can be taken in/out from the chamber 10. Although detailed illustration is omitted, the leak testing apparatus 1 is provided with a taking-in/out mechanism such as a manipulator that performs the above taking-in/out. The taking-in/out door 14 is closed, so that the inside of the chamber 10 is sealed. An O-ring 15 (seal member) is provided at a peripheral edge of the taking-in/out door 14. The O-ring 15 seals a space between a main body wall of the chamber 10 and the taking-in/out door 14.

Additionally, the chamber 10 is provided with a pressure sensor 4. The pressure sensor 4 measures the internal pressure of the chamber 10.

The capsule 20 has an openable/closeable part 29, and a capsule inner chamber 23 (internal space) that is opened/closed by the opening/closing operation of this openable/closeable part 29. The capsule 20 is housed inside the chamber 10. The chamber 10 and the capsule 20 configure a double tank structure. At least the openable/closeable part 29 of the capsule 20 should be housed inside the chamber 10 at the time of leak testing.

More particularly, the capsule 20 includes a capsule upper part 21 and a capsule lower part 22. The capsule upper part 21 is fixed to a ceiling of the chamber 10. The capsule lower part 22 is disposed inside the chamber 10 right below the capsule upper part 21. The capsule lower part 22 is vertically movably supported by a support part (not illustrated). The capsule lower part 22 is liftable by the capsule opener/closer 40. These capsule upper part 21 and capsule lower part 22 face so as to be able to vertically come in contact with and separate from each other. Facing parts of the capsule upper part 21 and the capsule lower part 22 (a lower part of the capsule upper part 21 and an upper part of the capsule lower part 22) configure the openable/closeable part 29. A recess is formed on a facing surface of at least one of the capsule upper part 21 and the capsule lower part 22. This recess configures the capsule inner chamber 23. On a facing surface of at least one of the capsule upper part 21 and the capsule lower part 22, an O-ring 25 (seal member) is provided so as to surround the capsule inner chamber 23. Herein, on the upper surface of the capsule lower part 22, the capsule inner chamber 23 is formed, and on the upper surface of the capsule lower part 22, the O-ring 25 is provided.

The capsule inner chamber 23 houses the test workpiece 9. In order to reduce adhesion gas, the surface area of an inner wall part of the capsule inner chamber 23 is preferably as small as possible, and the inner wall part is preferably smooth, and the inner wall part has a small specific surface area. Therefore, the inner capacity (substantially inner capacity of the capsule inner chamber 23) of the capsule 20 can store the test workpiece 9, and is preferably as small as possible, as long as a rise in the internal pressure of the capsule 20 can be almost ignored even when helium is leaked from the test workpiece 9 when the capsule inner chamber 23 is in a sealed state. When the inner capacity of the capsule 20 is increased, the rise in the internal pressure is suppressed, but the surface area is necessarily increased, and therefore unnecessary increase in inner capacity is unsuitable. Even when the internal pressure of the capsule 20 rises, when a maximum value where a flow rate of helium that permeates the O-ring 25 to be lost can be ignored is $1\times10^{-17}$ Pa m$^3$/s, the inner capacity of the capsule 20 may be $10^{-6}$ m$^3$ (1 mL) at most. Strictly, the capacity is not the "inner capacity" but remaining capacity when the test workpiece 9 is stored. It is assumed that the volume of the test workpiece 9 is about 0.0005 mL to about 0.1 mL, and therefore description is made by simply using "inner capacity". In a case of the capsule inner capacity of such a degree, even when leaked helium is accumulated up to a minimum detectable helium gas amount ($2.4\times10^{-11}$ Pa m$^3$) described later, the rise in the internal pressure of the capsule 20 is $2.4\times10^{-5}$ Pa, and the flow rate of helium in the capsule inner chamber 23 that permeates the O-ring 25 to be lost can be made to be $1\times10^{-17}$ Pa m$^3$/s or less. (When an helium permeation amount is estimated in a case where a sealing whole length L of a square sectional shape: $6\times10^{-2}$ m is assumed as a seal size enabling the configuration of the capsule inner chamber 23 of approximately $10^{-6}$ m$^3$ as the inner capacity of the capsule 20, helium permeation amount $Qp = K \cdot L \cdot \Delta P = 8.64\times10^{-18}$ Pa m$^3$/s is satisfied where helium permeation coefficient K: $6\times10^{-12}$ m$^2$/s, pressure difference $\Delta P$: $2.4\times10^{-5}$ Pa.) Thus, even in a case where an elastomer O-ring such as NBR that easily repeatedly obtains a stable sealing property is used as a seal material 25 of the capsule 20, the maximum (remaining capacity) size of the capsule 20 may be approximately 1 mL. In a case where a metal seal is used as the seal material 25, the inner capacity of the capsule 20 can be further reduced, and may be about 0.01 mL as long as the test workpiece 9 can be stored. Any capsule that can withstand a slight difference between internal pressure and external pressure may be used as the capsule 20, and the capsule 20 may has a wall thickness thinner than the chamber 10.

The capsule 20 is opened/closed by the capsule opener/closer 40. The capsule opener/closer 40 includes a driving cylinder 41 (driving unit), a lifting rod 42, an abutting part 43, and a metal bellows 44. The driving cylinder 41 is provided on an external lower side of the chamber 10. The lifting rod 42 protrudes above from the driving cylinder 41, and is disposed in the chamber 10. The abutting part 43 is provided at an upper end of the lifting rod 42. The abutting part 43 is disposed right below the capsule lower part 22. An outer periphery of the lifting rod 42 is surrounded by the metal bellows 44. The metal bellows 44 is vertically extendable, and has an upper end that abuts on a lower surface of the abutting part 43, and a lower end that abuts on a bottom of the chamber 10. The internal space of the chamber 10 and the inside of the driving cylinder 41 are blocked by the metal bellows 44.

Air pressure is introduced in a cylinder chamber of the driving cylinder 41, so that the lifting rod 42 is lifted. When the lifting rod 42 is raised, the abutting part 43 abuts on the capsule lower part 22 to push up the capsule lower part 22. Consequently, the capsule upper part 21 and the capsule lower part 22 are vertically combined with each other (openable/closeable part 29 is closed), and the capsule inner chamber 23 is sealed. When the lifting rod 42 is descended, the abutting part 43 and the capsule lower part 22 descend. Consequently, the capsule upper part 21 and the capsule lower part 22 are separated from each other (openable/closeable part 29 is opened), and the capsule inner chamber 23 is opened to the internal space of the chamber 10.

Furthermore, a monitor 6 is added to the capsule 20. The monitor 6 is configured by a fine differential pressure sensor. This monitor 6 is mounted on a side part of the capsule upper part 21. The capsule upper part 21 is formed with a sensor passage 26. The capsule inner chamber 23 and the monitor 6 are connected by the sensor passage 26. The monitor 6 detects differential pressure between the capsule inner chamber 23 and chamber inside space 13, thereby monitoring the pressure of the capsule inner chamber 23.

As the monitor 6, other pressure sensor such as a quartz friction vacuum sensor having a tuning fork quartz oscillator may be used in place of the fine differential pressure sensor.

The evacuator 30 includes a turbo molecular pump 31 (vacuum pump), a rotary pump 32 (roughing pump), and exhaust passages 33, 36 and 38. Gas in the chamber 10 is roughed by the rotary pump 32, and thereafter further evacuated by the turbo molecular pump 31, so that the inside of the chamber 10 is brought into a high vacuum state.

The main exhaust passage 33 extends from the chamber 10. The main exhaust passage 33 is provided with a main on-off valve 34 and a throttle 35. In the figure, the main on-off valve 34 and the throttle 35 are provided in this order from the chamber 10 side, but may be provided in the opposite order. In a case where the main on-off valve 34 solely has necessary throttle action, the throttle 35 may be omitted. A downstream end of the main exhaust passage 33 is connected to an intermediate stage suction port of the turbo molecular pump 31. The helium exhaust speed of the intermediate stage suction port of the turbo molecular pump 31 is about 3 L/s to about 20 L/s. The rear stage exhaust passage 36 extends from a lower stage exhaust port of the turbo molecular pump 31. The exhaust passage 36 is provided with a rear stage on-off valve 37. A downstream end of the exhaust passage 36 is connected to a suction port of the rotary pump 32. Independently from the main exhaust passage 33, a rough vacuum passage 38 extends from the chamber 10 to the rotary pump 32. In the middle part of the rough vacuum passage 38, a rough vacuum on-off valve 39 is provided. The rough vacuum passage 38 joins the exhaust passage 36 between the rear stage on-off valve 37 and the rotary pump 32.

A mass spectrometer 2 as a detector is connected to an upper stage connection port of the turbo molecular pump 31. The mass spectrometer 2 ionizes gas molecules that reversely diffuse and come from the intermediate stage of the turbo molecular pump 31, to be discharged in a magnetic field directed in a constant direction, so that molecular ions are separated in accordance with the mass. Then, only ions of specific weight corresponding to molecular weight of inspection gas (helium) are captured, so that an ion current signal that is proportional to inspection gas density is obtained. Then, a detection signal formed from a voltage signal obtained by converting the ion current signal into a voltage is generated. Consequently, helium in the above gas is detected. The helium detection by the mass spectrometer 2 is updated by a predetermined sampling period. The sampling period is, for example, 0.1 seconds, but the present invention is not limited to this. Additionally, delay such as a time constant of an amplifier that converts an ion current into a voltage is present in the detection signal, but is a value almost close to the sampling period, and therefore is not distinguished, and can be treated as the sampling period.

The mass spectrometer 2 responds to gas other than helium such as water ($H_2O$) with slight probability. Then, noise is generated in the detection signal. Helium sensitivity is influenced by a space charge effect depending on the pressure of the gas other than helium. Such gas that induces noise, other than helium, is referred to as "impurity gas". The impurity gas is exhausted from the chamber 10 along with helium that is inspection gas, but has large molecular mass, and therefore is unlikely to reversely diffuse upstream (to the upper stage) from the intermediate stage of the turbo molecular pump 31. Therefore, it is possible to suppress the noise of mass spectrometer 2.

A time constant $\tau c$ of evacuation of helium (inspection gas) is determined by the inner capacity of the chamber 10, and helium conductance of an exhaust system of the chamber 10. This time constant $\tau c$ is set such that $0.1 \text{ seconds} \leq \tau c \leq 1 \text{ second}$ is satisfied. More preferably, the time constant $\tau c$ is set such that $0.2 \text{ seconds} \leq \tau c \leq 1 \text{ second}$ is satisfied. The time constant $\tau c$ is expressed in the following Expression (1).

$$\tau c = V/C \quad (1)$$

Herein, V ($m^3$) denotes all inner capacity of a part in front of the throttle 35, namely, the inner capacity of the chamber 10 (including the capsule 20) and the passage part 33a, on a side closer to the chamber 10 than the throttle 35, of the main exhaust passage 33. In this embodiment, the inner capacity of the capsule 20 and the main exhaust passage part 33a is sufficiently smaller than the inner capacity of the chamber 10, and can be ignored, and therefore V is substantially regarded as the capacity of the chamber inside space 13 except the capsule 20. The inner capacity of the chamber 10 that is as small as possible within a range in which the above Expression (1) is satisfied is better, but the chamber 10 houses the capsule and is provided with valves, and therefore the inner capacity is about $10^{-4}$ $m^3$ to about $10^{-3}$ $m^3$ (100 mL to 1000 mL). C ($m^3/s$) denotes helium conductance of the exhaust system of the chamber 10, and is combined conductance that is derived from the main exhaust passage 33 and the main on-off valve 34, an opening degree (conductance) of the throttle 35, and the exhaust speed of the turbo molecular pump 31. A value of the conductance C is adjusted by mainly changing the diameter of the throttle 35 such that the time constant $\tau c$ of the exhaust of the chamber 10 becomes a suitable value.

The inner capacity V and the conductance C do not depend on the size of the test workpiece 9. Therefore, these V and C are set, so that the time constant $\tau c$ can be predetermined to a design value determined by Expression (1). The actual time constant $\tau c$ can be obtained by measuring time that becomes 37% of a standard leak steady-state value, by the use of a standard leak 61 described later.

The time constant $\tau c$ is correlated with a flow rate change when accumulated gas is released. When the time constant $\tau c$ is increased, a time for which the flow rate is decayed is increased, and a sufficient sampling frequency can be ensured. However, a peak flow rate reduces, and a value of the flow rate at each moment reduces (SN reduces) to come close to background, and therefore it becomes difficult to precisely obtain the entire amount of the accumulated gas. Additionally, the decay time of the flow rate increases, and therefore a measurement time needs to be increased. Accordingly, the upper limit of the time constant $\tau c$ is about 10 times the response time of the mass spectrometer 2 or the sampling period, and is preferably about 1 second.

When the time constant $\tau c$ is reduced, a peak flow rate at the releasing moment increases. However, the time for which the flow rate decays is shortened, and comes close to the response time or the sampling period of the mass spectrometer 2. Therefore, the sampling frequency of the flow rate is reduced, and it becomes difficult to precisely obtain the total amount of the above accumulated gas. Conversely, the response time or the sampling period of the mass spectrometer 2 are preferably as short as possible within a range in which the detection sensitivity of the mass spectrometer 2 is not sacrificed. However, when the response time of the mass spectrometer 2 is reduced, the mass spectrometer 2 weakens to noise, and detection sensitivity reduces, and therefore the response time is preferably about 50 ms to about 100 ms. The time constant $\tau c$ is preferably at least twice the response time or the sampling period of the mass spectrometer 2. Therefore, in view of a realistic performance balance, the lower limit of the time constant $\tau c$ is preferably about 0.1 seconds, and is more desirably about 0.2 seconds.

Furthermore, the leak testing apparatus 1 includes a nitrogen supply source 51 and the standard leak 61. The nitrogen supply source 51 is configured from a nitrogen bomb, and the like, and is connected to the chamber 10 via an on-off valve 52. When the test workpiece 9 is taken in/out or the like, nitrogen is introduced in the chamber 10 from the nitrogen supply source 51, so that the inside of the chamber 10 can be returned to atmospheric pressure.

As the gas for returning the inside of the chamber 10 to the atmospheric pressure, argon gas or dry air may be used in place of nitrogen gas.

The standard leak 61 is connected to the chamber 10 via an on-off valve 62. A small container 61b is provided between the standard leak 61 and the on-off valve 62. Helium can be allowed to stay in this small container 61b at a known flow rate. When the on-off valve 62 is opened, the above helium flows into the vacuum chamber 10, so that a pseudo leak can be generated. Consequently, it is possible to proofread the reading of the mass spectrometer 2.

Furthermore, the leak testing apparatus 1 includes a control arithmetic processing unit 3. The control arithmetic processing unit 3 controls the operation of the leak testing apparatus 1, and evaluates the leak of the test workpiece 9 on the basis of detection information by the mass spectrometer 2. Although detailed illustration is omitted, the control arithmetic processing unit 3 is provided with a microcomputer including a CPU, a memory, an input/output unit and the like; signal processing circuits of the mass spectrometer 2, the pressure sensor 4 and the monitor 6; and a drive circuit for driving the on-off valves 34, 37, 39, 52 and 62, the driving cylinder 41 and the like. For convenience of drawing, signal lines that connect between the control arithmetic processing unit 3 and the mass spectrometer 2, the monitor 6, and the partial on-off valves 34 and 62 are illustrated in FIG. 1. The memory of the control arithmetic processing unit 3 stores, for example, data such as an accumulation time Ta, a measurement time Ti, measurement target leak flow rate Rs (threshold value of leak determination), which will be described later, and a sequence program for operating the leak testing apparatus 1, and the like.

Figure 2:
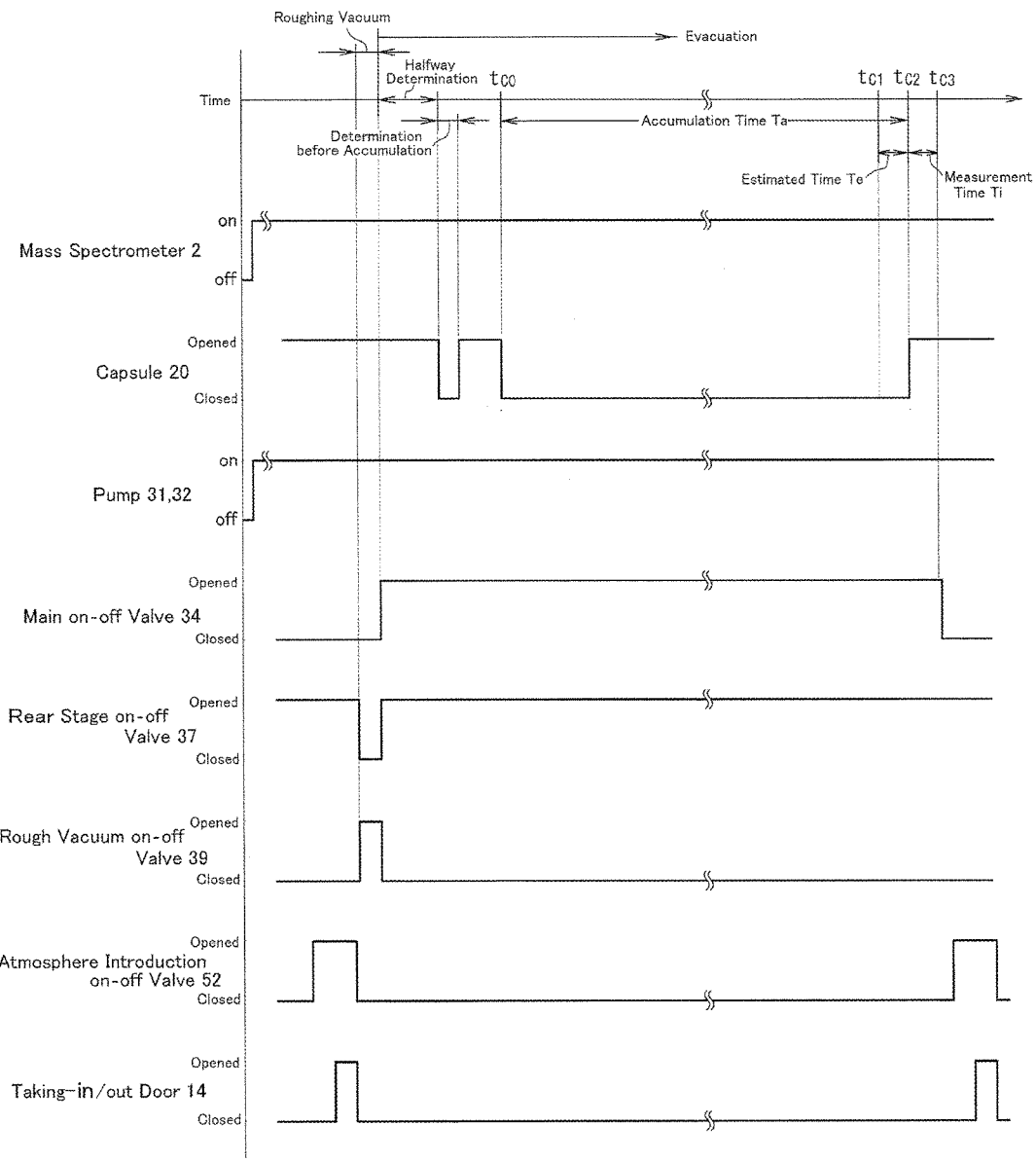
FIG. 2 is a time chart illustrating leak testing operation by the above leak testing apparatus.
Figure 3:
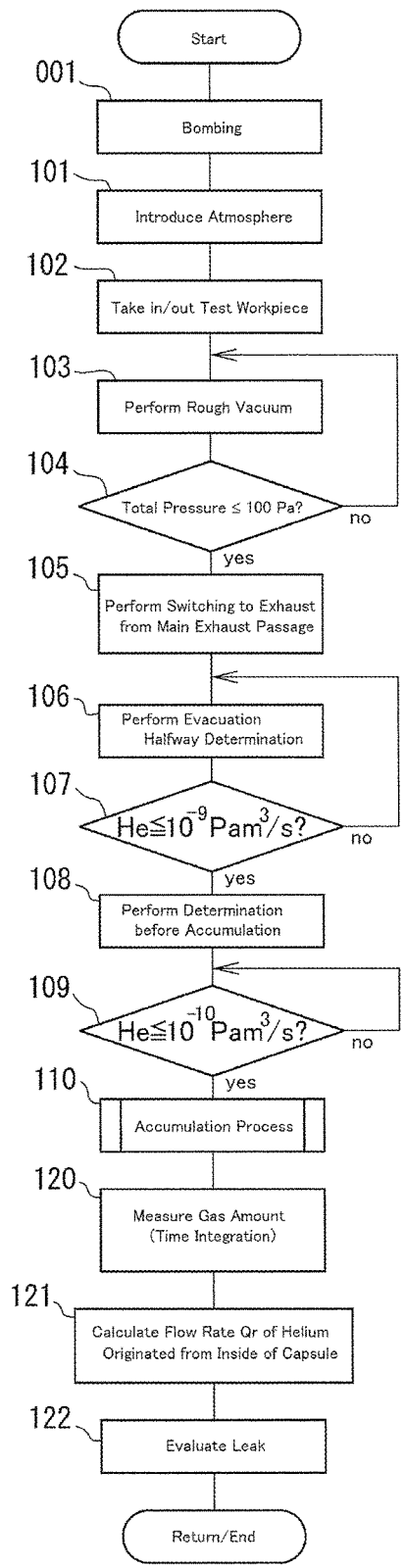
FIG. 3 is a flowchart illustrating leak testing procedures by the above leak testing apparatus.
Figure 4:
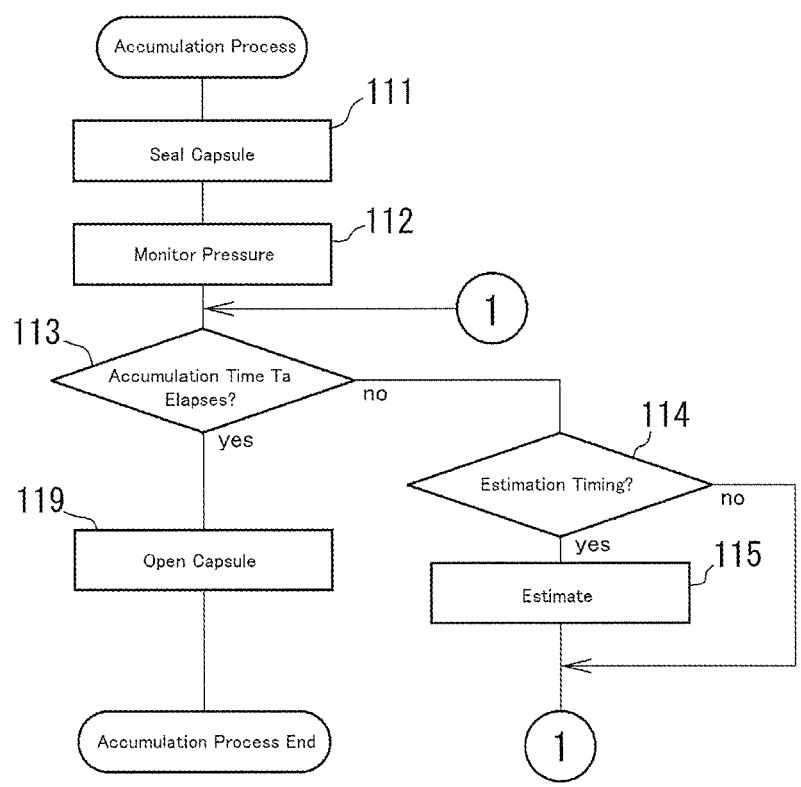
FIG. 4 is a flowchart illustrating a subroutine of an accumulation process of the above flowchart.

A leak testing method of the test workpiece 9 by the leak testing apparatus 1 is described with reference to the time chart of FIG. 2, the flowcharts of FIG. 3 to FIG. 4, and the graph of FIG. 5.

<Bombing Process>

Previously, the test workpiece 9 is put in the bombing tank (not illustrated in FIG. 1), and bombing by inspection gas (helium) is performed (Step 001). The bombing is the exposure of the test workpiece 9 to inspection gas atmosphere under a predetermined condition. When the above predetermined condition is decided, the above predetermined condition may be determined in compliance with a test standard (e.g., JIS C 60068-2-17 annex D method, MIL-STD-883J METHOD 1014. 14 Eq (1), or the like). In this bombing process, when the airtightness of test workpiece 9 is good, helium does not enter the internal space 9a at all or hardly enter the internal space 9a. On the other hand, in the test workpiece 9 whose airtightness is failure, helium enters the internal space 9a through the failure part.

The test workpiece 9 obtained after the above bombing is terminated is sent to the leak testing apparatus 1. The control arithmetic processing unit 3 automatically performs the subsequent operation in the leak testing apparatus 1 on the basis of the sequence program.

<Atmospheric Pressure Introducing Process>

First, nitrogen ($N_2$) is introduced into the chamber 10 from the nitrogen supply source 51, so that the inside of the chamber 10 is made into atmospheric pressure (Step 101).

<Test Workpiece Taking-In/Out Process>

Thereafter, the taking-in/out door 14 is opened, and the capsule lower part 22 is descended by the capsule opener/closer 40, so that the capsule inner chamber 23 is opened. Then, by the taking-in/out mechanism (not illustrated), the above test workpiece 9 is fed into the capsule inner chamber 23 through the taking-in/out door 14 (Step 102). Thereafter, the taking-in/out door 14 is closed, and the chamber 10 is sealed. In the valve state of the leak testing apparatus 1 at this time, only the rear stage on-off valve 37 is set to an open state, and the main on-off valves 34, 39, 52 and 62 other than the rear stage on-off valve 37 each are set to a closed state. The capsule 20 is set to an open state. The mass spectrometer 2 and the vacuum pumps 31 and 32 each are always set to an operating state.

<Rough Vacuum Process>

After the test workpiece 9 is fed and the chamber 10 is sealed, the rear stage on-off valve 37 is closed, and the rough vacuum on-off valve 39 is opened. Consequently, gas inside the chamber 10 passes through the rough vacuum passage 38 to be sucked to be exhausted by the rotary pump 32 (Step 103). Therefore, the pressure inside the chamber 10 is reduced. (At this time, the capsule 20 is opened.)

<High Vacuum Process>

When the pressure inside the chamber 10 falls to about 100 Pa (absolute pressure) or less (Step 104), the rough vacuum on-off valve 39 is closed, and the main on-off valve 34 and the rear stage on-off valve 37 is opened (Step 105). Consequently, the gas inside the chamber 10 passes through the main exhaust passage 33 to be sucked by the turbo molecular pump 31, and is further exhausted from the rotary pump 32 through the exhaust passage 36, so that the pressure inside the chamber 10 is further reduced to enter a molecular flow region. The pressure inside the chamber 10 may be calculated from an exhaust time, or may be measured by the pressure sensor 4.

When becoming about 0.1 Pa or less (molecular flow region), helium inside the chamber 10 is sucked to be exhausted at exhaust speed determined by the time constant τc (=V/C). Herein, C denotes the above helium conductance of the exhaust system of the chamber 10. Gas components other than the helium inside the chamber 10 differ in conductance, and are sucked to be exhausted at exhaust speeds determined by respective time constants. The exhaust speed of air is 37% of the exhaust speed of helium. In order to increase the exhaust speed of the turbo molecular pump 31 to accelerate the high vacuum of the chamber 10, the conductance of the main exhaust passage 33 may be temporarily increased (refer to a bypass circuit 71 in FIG. 8).

The inside of the chamber 10 is brought into a vacuum state, so that in the test workpiece 9 having airtightness failure, the above bombed helium is leaked from an airtight failure part. Hereinafter, this helium is referred to as "leaked helium". The leaked helium diffuses from the opened capsule inner chamber 23 to the chamber inside space 13. In the test workpiece 9 having good airtightness, the leaked helium is not generated at all or hardly generated.

<Detecting Process>

A part of the gas sucked from the chamber 10 to the turbo molecular pump 31 reversely diffuses from the intermediate stage part of the turbo molecular pump 31 to the mass spectrometer 2. Helium in this gas is detected by the mass spectrometer 2. Consequently, a detection signal (detected flow rate) having magnitude in accordance with a helium flow rate in the above suction gas is regularly output from the mass spectrometer 2 to the control arithmetic processing unit 3 at the interval of a sampling period (e.g., 0.1 seconds).

The above detection signal can include the influence of helium as the background or impurity gas such as vapor becoming noise of the following (a) to (f), in addition to the above leaked helium.

(a) Helium or impurity gas in air that enters the chamber 10 by opening/closing of the taking-in/out door 14.

(b) Helium or impurity gas adsorbed or adhered to surfaces defining the chamber inside space 13 and the main exhaust passage 33, except the capsule inner chamber 23, such as an inner wall of the chamber 10, an outer wall of the capsule 20, an outer peripheral surface of the bellows 44, an inner wall of the main exhaust passage 33, an inner wall of a passage inside the on-off valve 34 and an inner wall of the throttle 35.

(c) Helium or the like that externally penetrates a rubber seal member such as the O-ring 15 to enter the chamber 10 or the main exhaust passage 33 by high vacuum.

(d) Helium or impurity gas that stays in a pocket formed in a housing groove of the above rubber seal member or the like.

(e) Helium or the like that reversely diffuses from the exhaust port side of the turbo molecular pump (f) Helium or impurity gas adsorbed or adhered to surfaces, defining a space in the capsule 20, such as an inner wall of the capsule inner chamber 23, an outer surface of the test workpiece 9, and the like.

Gas that generates (leaks or desorbs) from places other than the inside of the capsule 20, and belong to (a) to (e) among the above are occasionally referred to as gas "originated from the outside of the capsule". Additionally, gas that generates (leaks or desorbs) inside the capsule 20 and belongs to (f) is occasionally referred to as gas "originated from the inside of the capsule". Particularly, as to background helium, in order to distinguish the gas originated from the outside of the capsule and the gas originated from the inside of the capsule, background helium originated from the outside of the capsule is described as "background helium BG 1", and background helium originated from the inside of the capsule is described as "background helium BG2".

As described above, helium more easily reversely diffuses to the mass spectrometer 2 than the above impurity gas, and therefore it is possible to reduce the noise of the detection signal.

<Proofread>

In the leak testing, a relation between the magnitude (a voltage value or a current value) of the detection signal and the helium flow rate needs to be previously calculated by previously proofreading the mass spectrometer 2. The proofreading can be performed as follows.

For example, the on-off valve 62 is opened, and the pseudo leak of helium of $1 \times 10^{-11}$ Pa m³/s is generated from the standard leak 61 to the vacuum chamber 10. Then, the on-off valve 62 is closed (equivalent to sealing of the capsule 20) for about 4 seconds to about 100 seconds (equivalent to the accumulation time Ta described later), and the above helium is accumulated in the small container 61b of the standard leak 61 (equivalent to the capsule 20). Next, the on-off valve 62 is opened (equivalent to the opening of the capsule 20), and helium measurement is performed for 1.5 seconds (equivalent to the measurement time Ti described later). For this 1.5 seconds, the amount of helium gas of $5.5 \times 10^{-11}$ to $1.015 \times 10^{-9}$ Pa m³ obtained by adding the amount of the gas accumulated in the small container 61b to the amount of gas generated in the standard leak 61 during the measurement flows from the standard leak 61 to the chamber 10, and therefore the reading of the mass spectrometer 2 can be proofread on the basis of the measurement result for this 1.5 seconds. The procedure for accumulating helium from the standard leak 61 and measuring the helium is similar to the procedure for accumulating helium from the test workpiece 9 and measuring the helium, later described in detail.

<High Vacuum Halfway Determination Process>

The leak testing apparatus 1 mainly determines extremely minute leak of $10^{-10}$ Pa m³/s or less, but preferably performs leak determination as needed even in the middle of suction up to $10^{-10}$ Pa m³/s (Step 106). In order to achieve this, for example, decay characteristics of the helium flow rate in a region of $10^{-10}$ Pa m³/s or less of the leak testing apparatus 1 (relation between each elapsed time after vacuum suction start, and a detected flow rate by the mass spectrometer 2) is examined by using a test workpiece previously known as a no-leak workpiece having good airtightness, and a threshold value per the above elapsed time derived from the decay characteristics is stored in the memory of the control arithmetic processing unit 3. Then, in an actual leak testing, in a case where the detected flow rate by the mass spectrometer 2 for each elapsed time exceeds the threshold value corresponding to the elapsed time, there is a high possibility that a relatively large helium leak from the test workpiece 9 occurs, and therefore it is determined that the test workpiece 9 has airtightness failure (leaks). For example, in a case where a helium flow rate of $10^{-6}$ Pa m³/s or more just after the suction start (opening of the main on-off valve 34) by the turbo molecular pump 31, a helium flow rate of $10^{-7}$ Pa m³/s or more after 1 second, a helium flow rate of $10^{-8}$ P am³/s or more after 2 seconds, or a helium flow rate of $10^{-9}$ Pa m³/s or more after 3 seconds is detected, it is determined that the test workpiece 9 has airtightness failure. In a case where it is determined in this high vacuum halfway determination process that the test workpiece 9 has airtightness failure, the leak testing may be terminated at that point.

<Determination Process Before Accumulation>

The decay characteristics of a helium flow rate in a region of $10^{-9}$ P am³/s to $10^{-10}$ Pa m³/s vary even in the test workpiece having good airtightness. Additionally, time until the helium flow rate reaches about $10^{-1}$ Pa m³/s from the suction start (opening of the main on-off valve 34) by the turbo molecular pump 31 is 10 seconds or more. Therefore, in order to improve the precision of the leak testing, accelerate the leak testing, and the like, the following determination process before accumulation may be performed.

For example, when the helium flow rate reaches about $10^{-9}$ Pa m³/s (Step 107), the capsule opener/closer 40 closes the capsule 20 once. Therefore, in a case where helium leaks from the test workpiece 9, the leaked helium is confined in the capsule inner chamber 23. Therefore, the detected flow rate by the mass spectrometer 2 reduces. By observing whether or not the detected flow rate reduces, the quality of the airtightness of a $10^{-9}$ Pa m³/s level of the test workpiece 9 can be determined (Step 108). More specifically, the capsule 20 is continued to be closed for, for example, at least the time of 5 times the time constant τc (5τc). Thereafter the capsule 20 is opened again. Then, arithmetic operation of the following Expression (1) is performed from a detected flow rate $Q_1$ right before closing the capsule 20, a detected flow rate $Q_2$ until the time of about 5τc elapses from the closing of the capsule 20, and a detected flow rate $Q_3$ until the time of about 5τc elapses from the opening of the capsule 20, so that a leak flow rate $Q_0$ is obtained.

$$Q_0 = Q_2 - (Q_1 + Q_3)/2 \qquad (1)$$

When the leak flow rate $Q_o$ exceeds a threshold value, it is determined that the test workpiece 9a has the leak of $10^{-9}$ Pa m³/s level (airtightness failure).

In a case where it is determined in this determination process before accumulation that the test workpiece 9 has airtightness failure, the leak testing may be terminated at that point. In a case where it is not determined as the airtightness failure, the internal pressure of the chamber 10 is further reduced in a state where the capsule 20 is open. The capsule 20 is open, so that background helium BG2 and impurity gas originated from the inside of the capsule can be sucked to be exhausted also after the determination process before accumulation. Therefore, it is possible to improve the precision of leak determination after an accumulation process, described later.

In a case where the reduction of the detected flow rate is not observed when the capsule 20 is closed in the determination process before accumulation, the capsule 20 is continued to be closed with no change, so that the process may proceed to the following accumulation process.

The helium flow rate reaches about $10^{-10}$ Pa m³/s after about 10 seconds to about 20 seconds from exhaust start by the turbo molecular pump 31 (opening of the main on-off valve 34). That is, it is possible to determine (measure) a larger leak than a leak of approximately $10^{-10}$ Pa m³/s within 10 seconds to 20 seconds.

<Accumulation Process>

In order to find a leak of approximately $10^{-10}$ Pa m³/s or less which is difficult to be determined (measured) in the processes until the above determination process before accumulation, an accumulation process is then performed (Step 110). That is, when the helium flow rate reaches, for example, about $10^{-10}$ Pa m$^3$/s (time $t_{C0}$) (Step 109), the capsule opener/closer 40 is operated, and the capsule 20 is sealed (Step 111). Consequently, in a case where helium leaks from the test workpiece 9, the leaked helium is accumulated in the capsule inner chamber 23, and does not diffuse into chamber inside space 13. Additionally, background helium BG2 originated from the inside of the capsule, which desorbs from an inner wall of the capsule 20 and the outer surface of the test workpiece 9, is also accumulated in the capsule inner chamber 23 along with the above leaked helium. These capsule leaked helium and background helium BG2 accumulated in the inner chamber 23 are hereinafter referred to as "accumulated helium".

The surface area of the inner wall of the capsule inner chamber 23 is extremely smaller than the surface area of the inner wall of the chamber 10, and therefore the background helium BG2 originated from the inside of the capsule among the accumulated helium is very smaller than background helium BG1 originated from the outside of the capsule.

Figure 5:
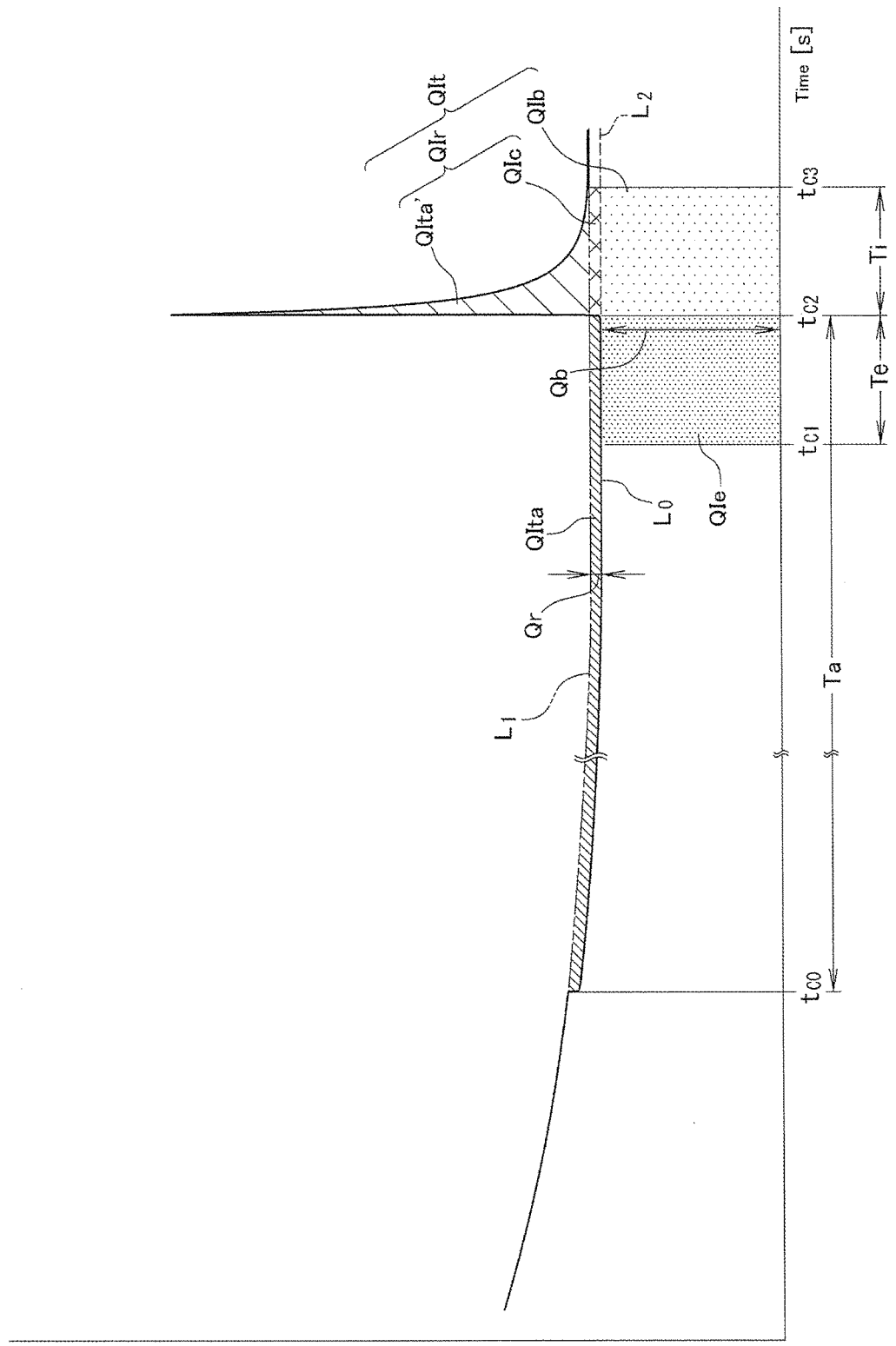
FIG. 5 is a graph conceptually illustrating a general behavior example of a detected helium flow rate in the accumulation process and a measurement process of the above leak testing.

As illustrated in FIG. 5, when the capsule 20 is closed at time $t_o$ (a certain stage in evacuation), helium originated from the inside of the capsule does not diffuse into the chamber 10, and therefore the detected flow rate by the mass spectrometer 2 is reduced by the amount of the above helium. An actual detection signal includes noise. Therefore, in a case where the level of the leak is $10^{-10}$ Pa m$^3$/s or less, reduction in the above detected flow rate is buried in the noise, and is difficult to be determined. FIG. 5 illustrates the reduction in the detected flow rate exaggeratedly. However, in a case where the reduction in the detected flow rate significantly appears at capsule sealing timing $t_{C0}$, it may be determined at that point when a leak occurs, and the accumulation time may be shortened. Alternatively, the time may be shortened without measuring an accumulation amount.

The gas in the chamber 10 is continuously sucked to be exhausted during the accumulation process. Therefore, during the accumulation process, background helium BG1 and impurity gas originated from the outside of the capsule such as helium and vapor desorbed from the inner wall of the chamber 10, and helium that externally penetrates the seal member such as the O-ring 15 to leak into the chamber 10 are sucked to be exhausted without being accumulated in the chamber 10.

On the other hand, during the accumulation process, impurity gas such as vapor desorbed from the inner wall of the capsule inner chamber 23 or the outer surface of the test workpiece 9 is also accumulated in the capsule inner chamber 23. Consequently, the pressure of the capsule inner chamber 23 rises. The pressure rise by the leaked helium is minute, and main factor of the pressure rise in the capsule inner chamber 23 is the above impurity gas. This pressure rise due to the impurity gas is not settled even when, for example, about 1000 seconds elapses, unless the capsule 20 or the test workpiece 9 is baked. The pressure rise continues for a relatively long time, for example, until the pressure of the capsule inner chamber 23 reaches several hundreds of Pa.

Figure 6:
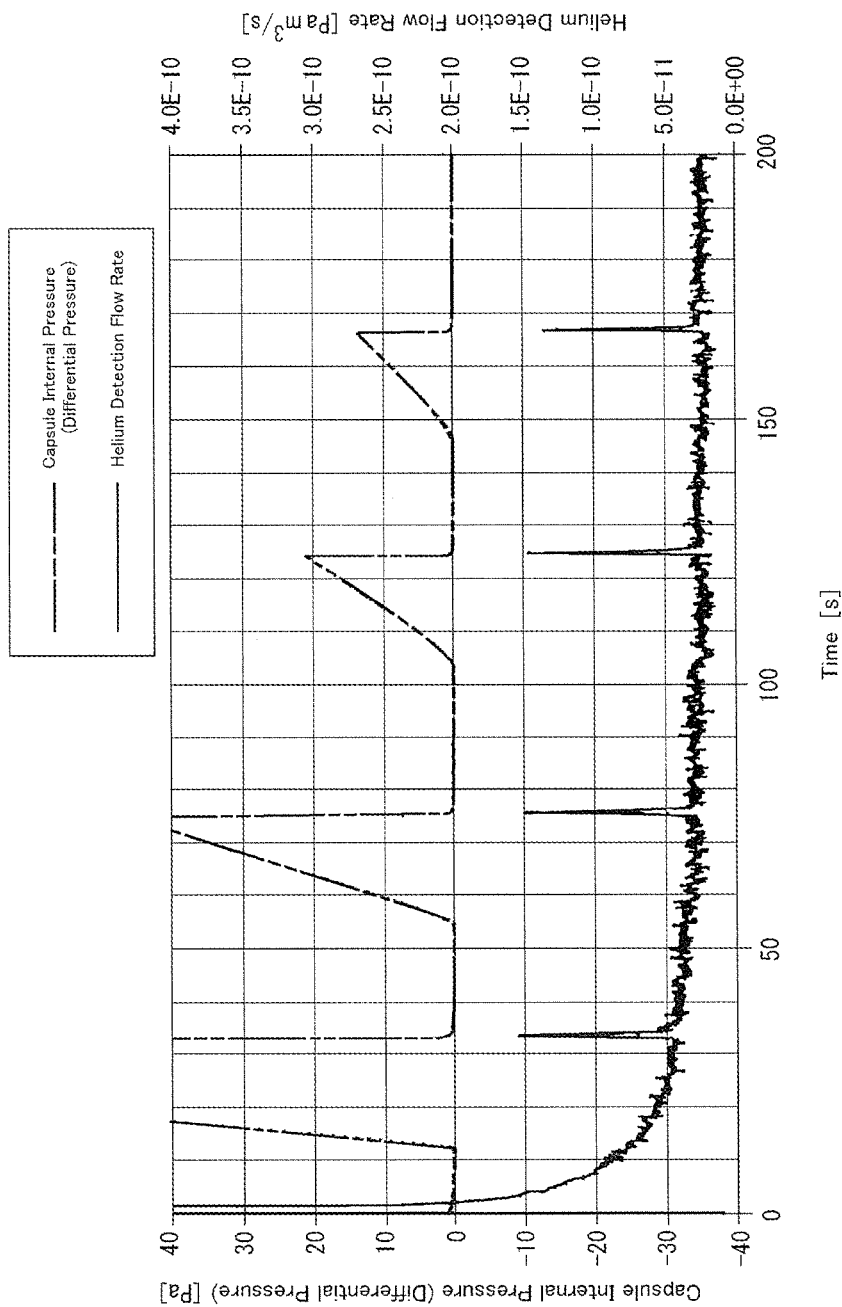
FIG. 6 is a graph illustrating an experimental result obtained by measuring changes with time of capsule internal pressure and a detected helium flow rate when a capsule, into which a test workpiece causing a fixed amount of leak is put, is repeatedly opened and closed.

FIG. 6 is a graph obtained by repeatedly opening/closing of the capsule 20 while evacuating and sucking the inside of the chamber 10, and measuring the total pressure (differential pressure with reference pressure) of the capsule inner chamber 23, and the detected helium flow rate by the mass spectrometer 2, by using an experimental apparatus having substantially the same structure as that of FIG. 1. In the capsule 20, a test workpiece 9 in which a helium leak occurs at a predetermined flow rate ($3\times10^{-12}$ Pa m$^3$/s) was housed. The inner capacity of the capsule 20 was 10 mm$^3$. The detected helium flow rate reached $1\times10^{-10}$ Pa m$^3$/s or less for about 10 seconds from exhaust start by the turbo molecular pump 31. About 13 seconds later, the operation of closing the capsule 20 for about 20 seconds and then opening the capsule 20 was repeated. As illustrated in FIG. 6, each time the capsule 20 was closed, capsule internal pressure rose. In addition, during the closing period of the capsule 20, the capsule internal pressure continued to rise. Thereafter, when the capsule 20 was opened, the capsule internal pressure instantaneously reduced to be returned to the level before the rise. (At the same time, the detected helium flow rate rapidly increases in a pulse form only for a short time.) Each time the capsule 20 was repeatedly opened/closed, the rise gradient of the capsule internal pressure became gentle. However, even when 150 seconds or more elapsed from the exhaust start by the turbo molecular pump 31, internal pressure rise was not settled during the closing of the capsule. For example, in a capsule closing period for 20 seconds of 104 seconds to 124 seconds from the exhaust start, differential pressure of about 21 Pa was generated, and a gas amount of $2.1\times10^{-7}$ Pa m$^3$ was accumulated in the capsule. A helium accumulation amount (including a leak amount for 1.5 seconds for measurement after the opening of the capsule) in this period was $6\times10^{-11}$ Pa m$^3$. Therefore, a gas amount that is 3500 times helium was generated in the capsule 20. It is considered that most of the above gas is impurity gas mainly composed of vapor.

<Capsule Internal Pressure Monitoring Process>

By utilizing the pressure rise by the above impurity gas, it can be determined whether or not the capsule 20 is properly sealed (Step 112). That is, the monitor 6 detects the pressure of the capsule inner chamber 23. When the capsule 20 is completely sealed, the detected pressure by the monitor 6 rises at a suitable rate. When the capsule 20 is incompletely sealed, the detected pressure by the monitor 6 does not rise at the suitable rate. Consequently, it is possible to monitor the sealing state of the capsule 20, and it is possible to output an alarm to inform when it is determined that the capsule is incompletely sealed.

<Accumulated Helium Gas Amount QIta>

The accumulation process is performed till timing $t_{C2}$ at which an accumulation time Ta (s) elapses from a capsule sealing timing $t_{c0}$ (Step 113). During this, a helium gas amount QIta (Pa m$^3$) accumulated in the capsule 20 is expressed in Expression (2).

$$QIta = Qr \times Ta \quad (2)$$

Herein, Qr denotes an instantaneous flow rate (Pa m$^3$/s) of helium originated from the inside of the capsule (leaked helium and background helium BG2). In the graph of FIG. 5, the accumulated helium gas amount QIta corresponds to the area of a part surrounded by a solid line $L_0$ and a virtual line $L_1$ illustrating detected flow rates from a time $t_{C0}$ to a time $t_{C2}$ (part patterned with slant lines at narrow intervals in this figure). The virtual line L1 is a virtual detected flow rate which would be as shown by L1, if the above helium originated from the inside of the capsule were not accumulated and diffused in the chamber 10.

<Accumulation Time Ta>

Herein, the accumulation time Ta (time when the capsule 20 continues to be sealed) is described.

Figure 7:
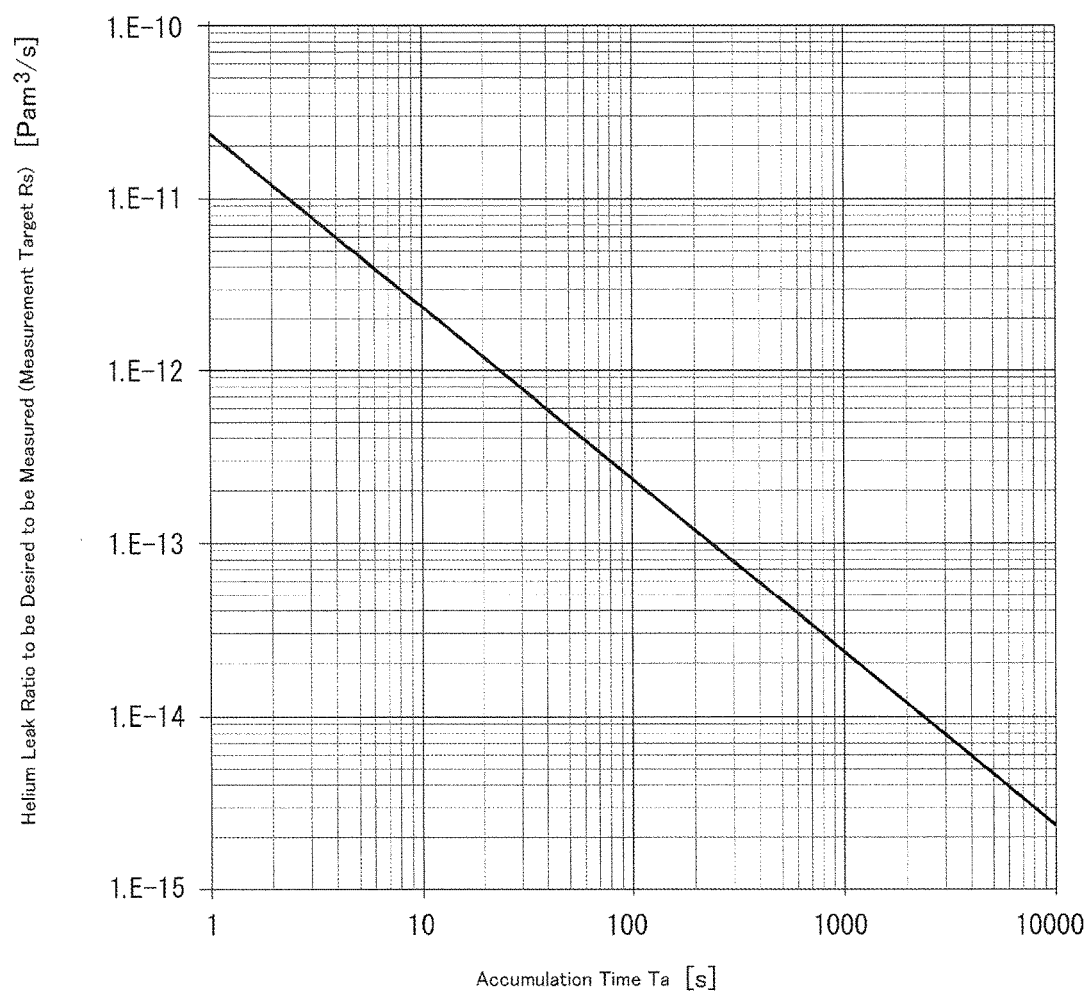
FIG. 7 is a graph illustrating a relation between a lower limit of a leak flow rate threshold value to be measured, and an accumulation time.

The accumulation time Ta is previously determined in accordance with a helium leak ratio (measurement target leak flow rate) Rs (Pa m$^3$/s) that is desired to be measured. As illustrated in FIG. 7, there is a constant relation between the measurement target leak flow rate Rs and the accumulation time Ta. The smaller the measurement target leak flow rate Rs is, the longer the accumulation time Ta is. Preferably, the accumulation time Ta is set such that the following Expression (3) is satisfied.

$$Ta \geq QIs/Rs \tag{3}$$

Herein, QIs denotes a minimum helium gas amount (Pa m³) detectable for the measurement time Ti described later. That is, this apparatus 1 does not monitor the flow rate (Pa m³/s) of leaked helium in real time, but accumulates gas in the capsule 20 for the predetermined time Ta, and then measures the accumulated gas for the constant measurement time Ti. Therefore, the minimum gas amount QIs that can be reliably measured for this measurement time Ti needs to be previously evaluated.

<Minimum Detectable Helium Gas Amount QIs>

The minimum detectable helium gas amount QIs can be obtained as follows.

For example, testing may be repeatedly performed n times with housing a good airtightness test workpiece known as having no-leak in the capsule 20, or without housing a test workpiece, and a standard deviation $\sigma_{n-1}$ of a difference QIt–QIb between a time integration amount QIt, described later, and a estimation amount QIb of helium gas originated from the outside of the capsule, described later, may be obtained as QIs=m×$\sigma_{n-1}$. Preferably, m=5 is satisfied. Consequently, the accumulation time Ta can be set such that helium gas is reliably detectable, and an undetectable state due to shortage of the accumulated amount can be reliably avoided. In an experimental apparatus in which the time constant τc was about 0.3 seconds, and the sampling period was 0.1 seconds, when leak testing was performed n=100 times by using the a good airtightness test workpiece 9 known as having no-leak, the minimum detectable helium gas amount QIs was QIs=2.4×10$^{-11}$ Pa m³. In this case, when a leak having a level of, for example, Rs=2×10$^{-14}$ Pa m³/s is desired to be found, the accumulation time Ta may be set to Ta=1200 seconds or more.

The above standard deviation value is preferably regularly evaluated when leak testing is performed, or preferably evaluated each time the type of the test workpiece 9 or the capsule 20 is changed.

According to the experiment, when an accumulated gas amount QIx was within a range of QIx=1×10$^{-8}$ Pa m³ to 2.4×10$^{-11}$ Pa m³, precise detection was possible. Additionally, when QIx<4×10$^{-5}$ Pa m³ was satisfied, it was confirmed that a relation with the detected flow rate of the leaked helium had monotonicity. Therefore, even when the leaked helium flow rate in the accumulation process is a maximum value (1×10$^{-10}$ Pa m³/s), the accumulation amount does not reach an accumulation limit of the capsule 20 until Ta=400000 seconds (about 4.6 days) is satisfied. In other words, in a case where the accumulation time Ta is Ta=400000 seconds, when the leaked helium flow rate is 6×10$^{-17}$ Pa m³/s or more, the accumulated gas amount becomes 2.4×10$^{-11}$ Pa m³ or more, and therefore detection is possible.

<Estimation Process>

After the capsule 20 is sealed (the accumulation process is started), when the time of at least 5 times the time constant τc (5τc (s)) elapses, helium originated from the inside of the capsule in the chamber inside space 13 becomes not less than 0.7%, and most of the detected flow rate by the mass spectrometer 2 becomes the flow rate of helium BG1 originated from the outside of the capsule. Therefore, when estimation start timing $t_{c1}$ preferably after 5τc elapses from the accumulation process start and before the accumulation process is terminated comes (Step 114), a gas amount QIe of helium BG1 originated from the outside of the capsule included in the measurement helium gas amount (time integration amount) QIt by the mass spectrometer 2 in the measurement time Ti, described later, is estimated from the detected flow rate by the mass spectrometer 2 (Step 115).

The detected flow rate Qb of the mass spectrometer 2 is the flow rate of background helium BG1 originated from the outside of the capsule. The background helium BG1 originated from the outside of the capsule at the end stage of the accumulation process reduces compared to the background helium BG1 originated from the outside of the capsule at the early stage of the accumulation process, and become stable, and therefore the flow rate of the background helium BG1 originated from the outside of the capsule in an estimated time Te and the flow rate of the background helium BG1 originated from the outside of the capsule in the measurement time Ti can be handled so as to be substantially equal. By utilizing this, simply, the length of the estimated time Te is made to be the same as the length of the measurement time Ti, and then, the gas estimation amount QIe of the helium originated from the outside of the capsule is made to be a value obtained by integrating, with the estimated time Te, the flow rate detected at the end stage of the accumulation process by the mass spectrometer 2.

By using the detected flow rate Qb at the end stage of the accumulation time Ta, arithmetic operation as expressed in the following Expression (4) may be performed.

$$QIe(Pa\ m^3) = Qb(Pa\ m^3/s) \times Te(s) \tag{4}$$

The flow rate Qb includes the background helium BG1 originated from the outside of the capsule (the above (a) to (e)) and does not include the leaked helium originated from the inside of the capsule and the background helium BG2 (the above (f)), because the flow rate Qb is the helium flow rate measured in the sealing of the capsule 20 by the mass spectrometer 2.

The length of the estimated time Te is preferably made to be the same as the length of the measurement time Ti (Te=Ti), and the end timing $t_{c2}$ of the estimated time Te preferably coincides with the end timing of the accumulation time Ta. As described later, Ti=about 0.3 seconds to about 6 seconds is satisfied. Therefore, time from the start of the estimated time Te to the end of the measurement time Ti is about 0.6 seconds to about 12 seconds, and therefore it is considered that the gas amount of the background helium BG1 originated from the outside of the capsule in the estimated time Te is substantially the same as the gas amount of the background helium BG1 originated from the outside of the capsule in the measurement time Ti. Consequently, the above estimation is appropriate. In the graph of FIG. 5, an estimated amount QIe corresponds to the area of a quadrangle surrounded by the solid line $L_0$ illustrating the detected flow rate, a perpendicular line of a time $t_{C1}$, a perpendicular line of a time $t_{C2}$, and a time axis (part patterned with thick dots in this figure). The calculation of the estimated amount QIe is performed by the control arithmetic processing unit 3. At this time, the control arithmetic processing unit 3 functions as an "estimator".

<Opening Process>

When the accumulation time Ta elapses $t_{C2}$ (=$t_{C0}$+Ta), the capsule opener/closer 40 opens the capsule 20 (Step 119). Consequently, the capsule inner chamber 23 is opened to the chamber inside space 13. Therefore, the gas accumulated in the capsule inner chamber 23 diffuses from the capsule inner chamber 23 into the chamber inside space 13 to be mixed with gas in the chamber inside space 13, and passes through the main exhaust passage 33 to be sucked by the turbo molecular pump 31. Helium in this suction gas is detected by the mass spectrometer 2. Therefore, as illustrated in FIG. 5, the detected flow rate by the mass spectrometer 2 temporarily rapidly rises. The peak and the decay time of this detected flow rate depend on the time constant τc. The shorter the time constant τc is, the higher the peak is, and the shorter the decay time is. The longer the time constant τc is, the lower the peak is, and the longer the decay time is. The time constant τc can be set to a proper value by the inner capacity V of the chamber 10, and the like, and the change of the detected flow rate after the opening of the capsule 20 can be reliably measured.

The impurity gas (such as vapor, nitrogen and oxygen) in the chamber 10 can be significantly reduced by the evacuation in the above accumulation process, and therefore it is possible to sufficiently enhance the accuracy of subsequent helium detection. In addition, as described above, helium more easily reversely diffuses from the intermediate stage of the turbo molecular pump 31 to flow into the mass spectrometer 2 than other gas, and therefore it is possible to increase the compression ratio of helium to impurity gas viewed from the mass spectrometer 2, and to further increase the accuracy of the helium detection.

<Gas Amount Measurement Process (Time Integration)>

The control arithmetic processing unit 3 obtains accumulated helium gas amount (or equivalent to the gas amount) from the change of the detected flow rate after the above opening. More specifically, the detected flow rate in the measurement time Ti after the opening of the capsule 20 by the mass spectrometer 2 is time-integrated, and the measurement helium gas amount (time integration amount) QIt (Pa m$^3$) is obtained (Step 120). The measurement time Ti is preferably 3 times to 6 times the time constant τc (3 τc≤Ti≤6 τc). More preferably, the measurement time Ti is 5 times to 6 times the time constant τc (5τc≤Ti≤6τc). In a case of Ti=3τc, the measurement helium gas amount QIt can includes 95.0% of the total amount of helium accumulated in the capsule 20 in the accumulation process. In a case of Ti=6τc, the measurement helium gas amount QIt can include 99.8% of the total amount of the above accumulated helium. Since τc=about 0.1 seconds to about 1 second is satisfied, Ti=about 0.3 seconds to about 6 seconds is satisfied.

The time constant τc is determined by the inner capacity V of the chamber 10 and the conductance C of the main exhaust passage 33, and can be previously measured or set, and therefore even when the detection signal is such small that the peak value after the opening of the capsule 20 and a value of 37% cannot be clarified, and SN is small, the measurement time Ti can be previously determined.

As illustrated in FIG. 5, the measurement helium gas amount QIt includes not only a discharge amount QIta' (Pa m$^3$) due to the releasing of the accumulated helium in the accumulation time Ta, but also a gas amount QIc (Pa m$^3$) of the helium originated from the inside of the capsule (leaked helium and background helium BG2) in the measurement time Ti, and a gas amount QIb (Pa m$^3$) of the background helium BG1 originated from the outside of the capsule.

$$QIt=QIta'+QIc+QIb \qquad (5)$$

QIta' coincides with the accumulated helium amount QIta in the accumulation time Ta (QIta'=QIta). Therefore, $$QIt=QIta+QIc+QIb \qquad (6)$$

is satisfied.

In FIG. 5, QIta' corresponds to the area of a part surrounded by the solid line $L_0$ illustrating the detected flow rate, and a virtual line $L_1$ from the time integration start time $t_{C2}$ to time integration end time $t_{C3}$ (=$t_{C2}$+Ti) (part patterned with slant lines at wide intervals in this figure). The area of this part corresponding to QIta' coincides with the area of the part corresponding to QIta (part patterned with the slant lines at the narrow intervals in this figure). QIc substantially corresponds to the area of a part sandwiched between the two virtual lines $L_1$ and $L_2$ during time $t_{C2}$ to $t_{C3}$ (part patterned with slant lattice in this figure). The virtual line $L_2$ is a line obtained by extending the line $L_0$ illustrating the detected flow rate in the accumulation process. QIb corresponds to the area of a quadrangle surrounded by the virtual line $L_2$, a perpendicular line of a time $t_{C2}$, a perpendicular line of a time $t_{C3}$, and the time axis (part patterned with dots at thin density in this figure).

In a case where the measurement time Ti is set to Ti=about 3 to 4×τc(s), time delay from the opening of the capsule 20 to the rising of the detection signal of the mass spectrometer 2 is preferably taken into account. (According to the experimental apparatus, time delay of about 0.1 seconds to about 0.2 seconds was confirmed.) The timing of staring the time integration of the detection value of the mass spectrometer 2 may be shifted within this delayed time.

<Process Of Calculating Flow Rail Of Helium Originated From Inside Of Capsule>

Next, a gas amount QIr (=QIt−QIb) is calculated by deducting the gas estimation amount QIb of the helium originated from the outside of the capsule from the measurement helium gas amount QIT. The gas amount QIr is the sum of the discharged helium gas amount QIta', and the gas amount QIc of helium originated from the inside of the capsule in the measurement time Ti.

$$QIr=QIta'+QIc \qquad (7)$$

The discharged helium gas amount QIta' is equal to the accumulated helium gas amount QIta, and therefore $$QIr=QIta+QIc \qquad (8)$$

is established. That is, QIr is the gas amount (Pa m$^3$) of helium originated from the inside of the capsule from the start time $t_{C0}$ of the accumulation process to the end time $t_{C3}$ of the measurement process (Ta+Ti). As expressed in Expression (9), by dividing this gas amount QIr of the helium originated from the inside of the capsule by the time (Ta+Ti), the flow rate Qr of the helium originated from the inside of the capsule is obtained (Step 121).

$$Qr=QIr/(Ta+Ti) \qquad (9)$$

Alternatively, the flow rate Qr of the helium originated from the inside of the capsule may be obtained by Expression (10).

$$Qr=QIr/(Ta+Ti-\tau c) \qquad (10)$$

Herein, Expression (10) takes into account the response delay (response delay of the time constant τc of evacuation) of the flow rate Qr component of the helium originated from the inside of the capsule in the measurement time Ti, with respect to Expression (9).

<Leak Evaluation Process>

On the basis of this flow rate Qr of the helium originated from the inside of the capsule, leak evaluation such as existence or non-existence of a leak and the level of a leak is performed (Step 122). The control arithmetic processing unit 3 performs the evaluation. At this time, the control arithmetic processing unit 3 functions as an evaluator. More specifically, the control arithmetic processing unit 3 compares the flow rate Qr of the helium originated from the inside of the capsule with the measurement target leak flow rate Rs (threshold value). In a case of Qr≥Rs, the control arithmetic processing unit 3 determines that the test workpiece 9 leaks (has airtightness failure). In a case of Qr<Rs, the control arithmetic processing unit 3 determines that the test workpiece 9 has good airtightness. The flow rate Qr of the helium originated from the inside of the capsule includes not only the leaked helium flow rate from the test workpiece 9 but also the flow rate of the background helium BG2 originated from the inside of the capsule. However, the capsule 20 is small, and therefore the above background helium BG2 can be sufficiently reduced. Therefore, it is possible to improve the reliability of the leak testing.

Additionally, the inner wall of the capsule inner chamber 23 is smoothened, so that it is possible to suppress adsorption of gas into the inner wall, and it is possible to reduce the background helium BG2 and the impurity gas originated from the inside of the capsule.

The flow rate of background helium B2 originated from the inside of the capsule, which includes influence of bombing, may be previously measured by using a test workpiece that can be regarded as no leak. In the test of the actual test workpiece 9, the measurement flow rate of the above background helium BG2 may be deducted from the calculated flow rate Qr of the helium originated from the inside of the capsule.

Consequently, it is possible to extract the leaked helium flow rate. This leaked helium flow rate is compared with the measurement target leak flow rate Rs, so that it is possible to further enhance the accuracy of the leak determination.

<Test Workpiece Exchange Process>

After the elapse of the above measurement time Ti, the on-off valve 34 is closed, and then the nitrogen introduction on-off valve 52 is opened, and nitrogen gas is introduced in the chamber 10, so that the pressure of the inside of the chamber 10 is made to become atmospheric pressure. Thereafter, the taking-in/out door 14 is opened, and the test workpiece 9 is exchanged.

The leak testing apparatus 1 is provided separately with the container (capsule 20) for storing leaked helium and opening at once and the container (chamber 10) for determining the exhaust time constant τc for properly measuring stored gas amount. Therefore, the inner capacity V of the chamber 10 is made to be larger than the inner capacity of the capsule 20, so that the time constant τc can be determined to a proper value, and accumulated helium can be reliably detected. In addition, the capsule 20 is made smaller than the chamber 10, so that it is possible to reduce the background helium BG2 and impurity gas originated from the inside of the capsule. Additionally, gas inside the chamber 10 is evacuated during the accumulation, so that it is possible to reduce the background helium BG1 and impurity gas originated from the outside of the capsule. In addition, the capsule 20 is blocked from outside air, and is always placed in evacuated atmosphere during the accumulation process, and therefore it is possible to avoid the entering of gas such as the helium BG1 from the outside into the capsule 20. Therefore, it is possible to accumulate only gas originated from the inside of the capsule generated from the inside of the capsule 20 (the inner wall and the test workpiece 9). In addition, the gas amount of the background helium BG1 originated from the outside of the capsule is estimated, and the estimated gas amount is deducted from the measurement helium gas amount QIt, so that it is possible to extract the gas amount QIr of the helium originated from the inside of the capsule. Furthermore, gas amount QIr of the helium originated from the inside of the capsule is divided by the total amount of the accumulation time Ta and the measurement time Ti, so that it is possible to accurately obtain the flow rate Qr of the helium originated from the inside of the capsule. As a result, it is possible to enhance the reliability of the leak testing.

The inner capacity of the chamber 10 is made to be preferably at least 100 times the inner capacity of the capsule 20, more preferably at least 1000 times the inner capacity of the capsule 20, so that it is possible to reduce the surface area ratio of the inner wall of the capsule 20 with respect to the inner wall of the chamber 10 to reliably reduce the background helium BG2 and impurity gas originated from the inside of the capsule, and it is possible to improve the precision of the leak testing.

Additionally, the accumulation time Ta can be definitely determined from the leak flow rate Rs to be desired to be measured, and the minimum detectable gas amount QIs. Furthermore, the time Ti for measuring accumulated helium gas amount can be determined in accordance with the time constant τc. The time Ti is definite even in a case where the identification of the peak of the detected flow rate is difficult.

Now, other embodiments of the present invention are described. In the following embodiments, the contents which are overlapped with the already described embodiment are omitted while the same reference numerals are denoted in the figures.

Figure 8:
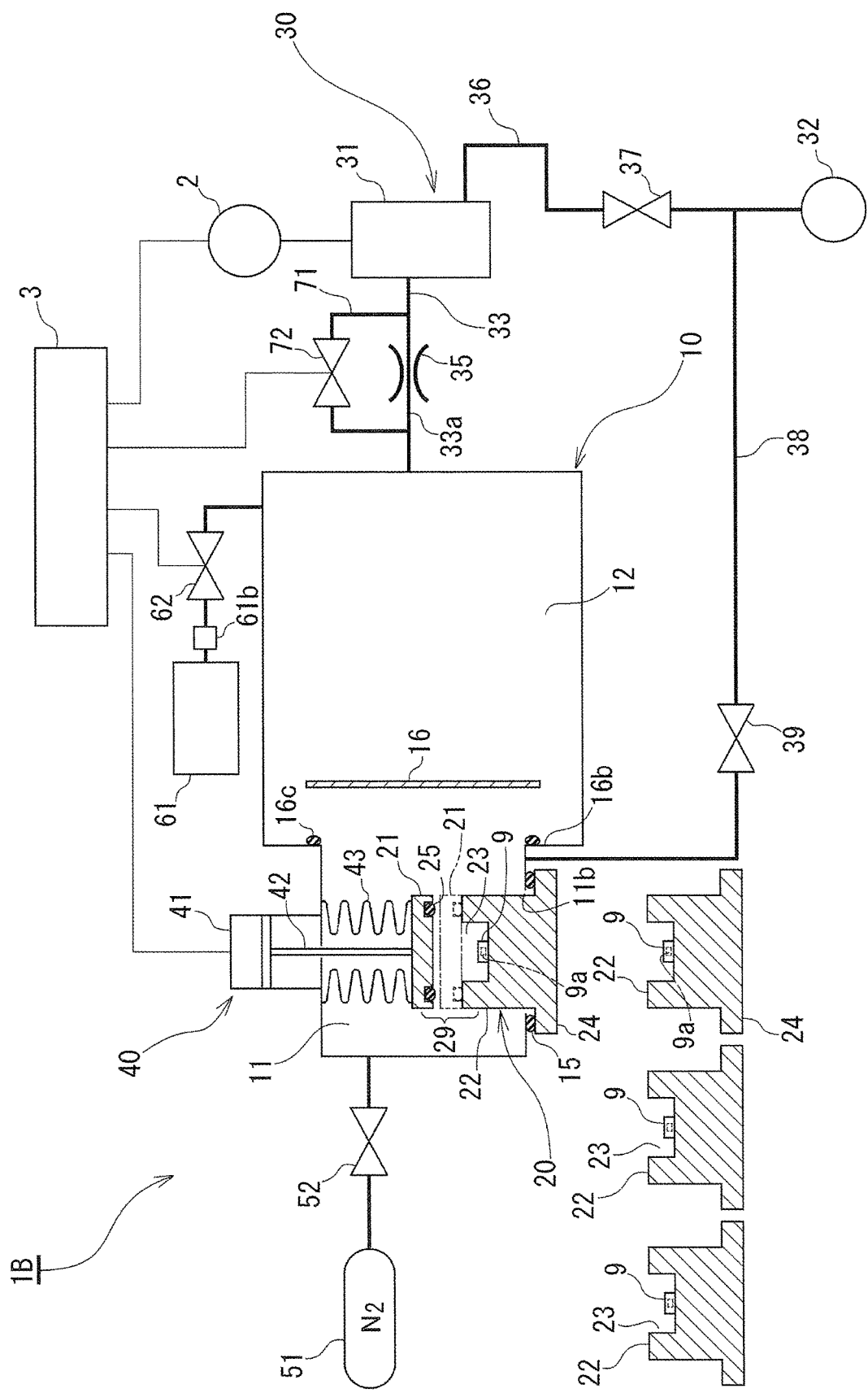
FIG. 8 is a circuit diagram illustrating a schematic configuration of a leak testing apparatus of a second embodiment of the present invention.
Figure 9:
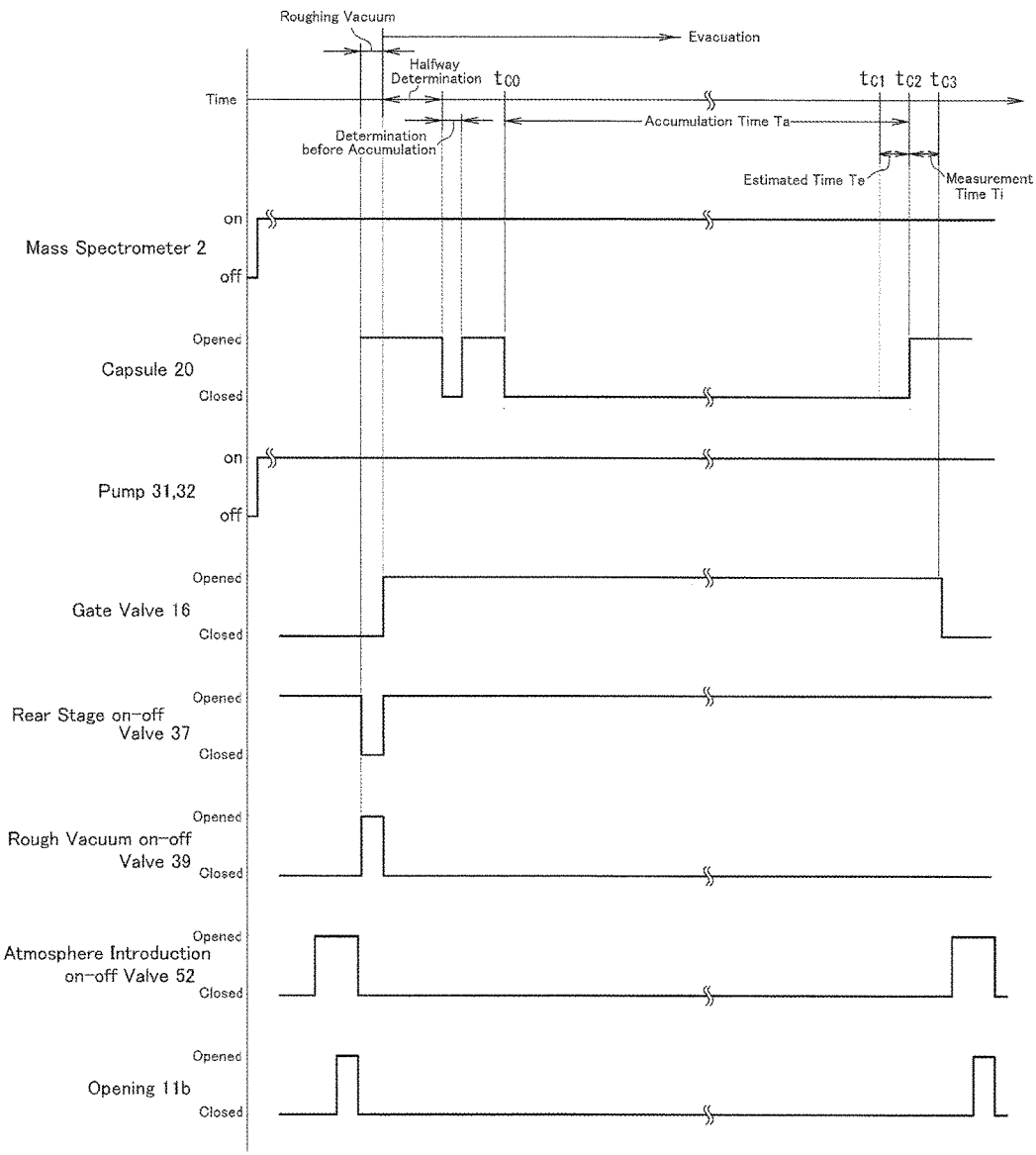
FIG. 9 is a time chart illustrating leak testing operation by the leak testing apparatus according to the above second embodiment.

FIG. 8 and FIG. 9 each illustrate a leak testing apparatus 1B according to a second embodiment of the present invention. As illustrated in FIG. 8, a chamber 10 of the leak testing apparatus 1B is provided with a gate valve 16 (partition). The gate valve 16 partitions the inside of the chamber 10 into a first chamber 11 and a second chamber 12. Preferably, the inner capacity V1 of the first chamber 11 is smaller than the inner capacity V2 of the second chamber 12 (V1<V2). A stepped valve seat 16b is formed between the first chamber 11 and the second chamber 12.

The gate valve 16 is formed by, for example, a solenoid valve, and is displaceable between a block position and a communication position. The gate valve 16 abuts on the valve seat 16b at the block position to block the first chamber 11 and the second chamber 12. The valve seat 16b is provided with an O-ring 16c (seal member) for airtightly sealing a space between the gate valve 16 and the valve seat 16b at the block position. The O-ring 16c may be provided in the gate valve 16. At the communication position, the gate valve 16 is separated from the valve seat 16b to communicate the first chamber 11 and the second chamber 12. At this time, the opening area of the gate valve 16 is sufficiently larger than the opening area of a throttle 35. Therefore, the inner capacity V of the chamber 10, which is the total of the first chamber 11 and the second chamber 12, can deal with the exhaust characteristics of the chamber 10.

A capsule 20 is disposed in the first chamber 11. A capsule opener/closer 40 is connected to a capsule upper part 21. A driving cylinder 41 is installed on an upper part of the chamber 10. A lifting rod 42 is suspended in the chamber 10 from a ceiling of the chamber 10. The capsule upper part 21 is vertically movably supported at a lower end of this lifting rod 42. A metal bellows 43 is disposed between the ceiling of the chamber 10 and the capsule upper part 21.

The leak testing apparatus 1B of the second embodiment includes a plurality of capsule lower parts 22 (four in the figure). A bottom of each capsule lower part 22 is integrally provided with a flange-like lid 24. Each of these capsule lower parts 22 is housed in the first chamber 11 in sequence by a conveyance mechanism (not illustrated). The conveyance mechanism may be configured by a turntable or a manipulator. At a bottom of the first chamber 11 in the chamber 10 is formed with an opening 11b. Each capsule lower part 22 is inserted into the first chamber 11 from the opening 11b, and vertically faces the capsule upper part 21. The lid 24 of the capsule lower part 22 housed in the first chamber 11 blocks the opening 11b, and seals the chamber 10. In the sealing state of the chamber 10, a bottom part including the lid 24 in the capsule lower part 22 protrudes from the outside of the first chamber 11. An O-ring 15 (seal member) is provided around the opening 11b in the bottom of the chamber 10. This O-ring 15 seals a space between the bottom of the chamber 10 and the lid 24. The O-ring 15 may be provided in the lid 24.

As illustrated by a two-dot chain line of FIG. 8, the capsule upper part 21 is descended by the opener/closer 40, so that the capsule upper part 21 and the capsule lower part 22 are combined with each other, and the capsule inner chamber 23 is sealed. The opener/closer 40 raises the capsule upper part 21, so that the capsule upper part 21 and the capsule lower part 22 are separated from each other, and the capsule inner chamber 23 is opened. Facing parts of these capsule upper part 21 and capsule lower part 22 configure an openable/closeable part 29. The openable/closeable part 29 is disposed inside the first chamber 11 in the sealing state of the chamber 10.

A main exhaust passage 33 of an evacuator 30 and a turbo molecular pump 31 are continued to the second chamber 12. The main exhaust passage 33 is not provided with the main on-off valve 34 according to the first embodiment. The gate valve 16 handles the function of the main on-off valve 34. Additionally, the main exhaust passage 33 is provided with a bypass passage 71 that bypasses the throttle 35. The bypass passage 71 is provided with a bypass on-off valve 72. Furthermore, a rough vacuum passage 38 is continued to the first chamber 11.

A nitrogen supply source 51 is continued to the first chamber 11.

A standard leak 61 is connected to the second chamber 12, but may be connected to the first chamber 11.

The characteristic contents of the operation of the leak testing apparatus 1B is mainly described versus the operation of the leak testing apparatus 1.

<Feeding Process>

When the bombing of a test workpiece 9 is terminated, the test workpiece 9 after the above bombing is housed in an inner chamber 23 of each capsule lower part 22.

<Exchange Process>

In the leak testing apparatus 1B, each capsule lower part 22 is set in the chamber 10 in sequence by the conveyance mechanism (not illustrated), the leak testing of the test workpiece 9 set in each capsule lower part 22 is performed. When the set capsule lower part 22 and test workpiece 9 are exchanged by a next capsule lower part 22 and a test workpiece 9, the gate valve 16 is put at the block position (closed state), and the first chamber 11 and the second chamber 12 are blocked. A valve 37 is opened, and valves 39, 62 and 72 are closed. Then, a nitrogen introduction on-off valve 52 is opened, so that nitrogen gas is introduced in the first chamber 11, and the pressure of the first chamber 11 is made to become atmospheric pressure. In this state, the capsule lower part 22 set in the first chamber 11 is pulled out from the opening 11b. Then, the next capsule lower part 22 is inserted into the opening 11b, and the opening 11b is blocked by the lid 24 of this capsule lower part 22, and the first chamber 11 is sealed.

As illustrated in the time chart of FIG. 9, a mass spectrometer 2, and pumps 31 and 32 are always in an operating state. Therefore, the second chamber 12 is evacuated by the turbo molecular pump 31 also in the exchange process, and is in a high vacuum state. Briefly, according to the leak testing apparatus 1B, by placing only the vicinity of the capsule 20 in the chamber 10 (the first chamber 11) in atmosphere, the test workpiece 9 can be exchanged.

<Rough Vacuum Process>

In a rough vacuum process, the gate valve 16 is maintained at the block position (closed state). In addition, the capsule 20 is open. In this state, the rough vacuum on-off valve 39 is opened, so that gas in the first chamber 11 is roughed by the rotary pump 32, and the pressure of the first chamber 11 is reduced.

A pressure sensor (not illustrated) may be provided in the first chamber 11, and may monitor the pressure of the first chamber 11.

<High Vacuum Process>

At a point when the pressure of the first chamber 11 reaches about 100 Pa, the rough vacuum on-off valve 39 is closed, the rear stage on-off valve 37 is opened, the gate valve 16 is put at the communication position (open state), and the first chamber 11 and the second chamber 12 are communicated with each other. Consequently, gas in the first chamber 11 and the second chamber 12 passes through the main exhaust passage 33 to be sucked to be exhausted by the turbo molecular pump 31.

<Vacuum Speed Acceleration Process>

During the process of this high vacuum, the bypass on-off valve 72 is temporarily opened, so that gas which flows through the main exhaust passage 33 may be bypassed by the bypass passage 71. Consequently, the conductance of the evacuator 30 can be temporarily increased. Therefore, it is possible to accelerate exhaust of not only helium, but also exhaust of molecules, such as air, whose exhaust speed in a molecular flow region is slower than the exhaust speed of helium.

The contents of the subsequent process to leak evaluation are substantially similar to those of the first embodiment. In an accumulation process, the capsule opener/closer 40 descends the capsule upper part 21, so that the capsule 20 is sealed. The gate valve 16 is open during an accumulation time Ta and a measurement time Ti after the rough vacuum process is terminated. Furthermore, the gate valve 16 is kept open right before a test workpiece exchange process, at longest.

After the leak evaluation is terminated, the gate valve 16 is closed, and the above exchange process is performed. The above operation is repeated, so that the leak testing can be performed for a plurality of the test workpieces 9 in sequence.

Figure 10:
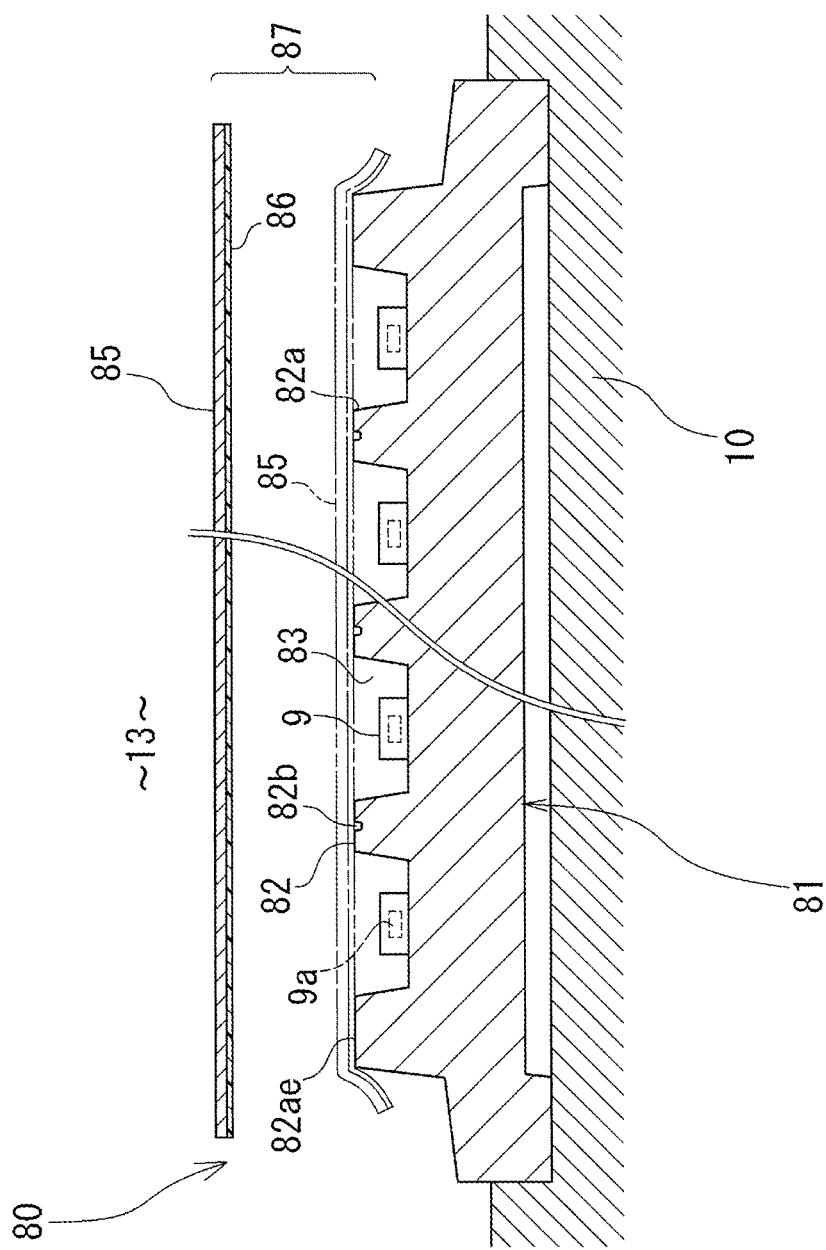
FIG. 10 is a sectional view of a collection capsule of a leak testing apparatus according to a third embodiment of the present invention.
Figure 11:
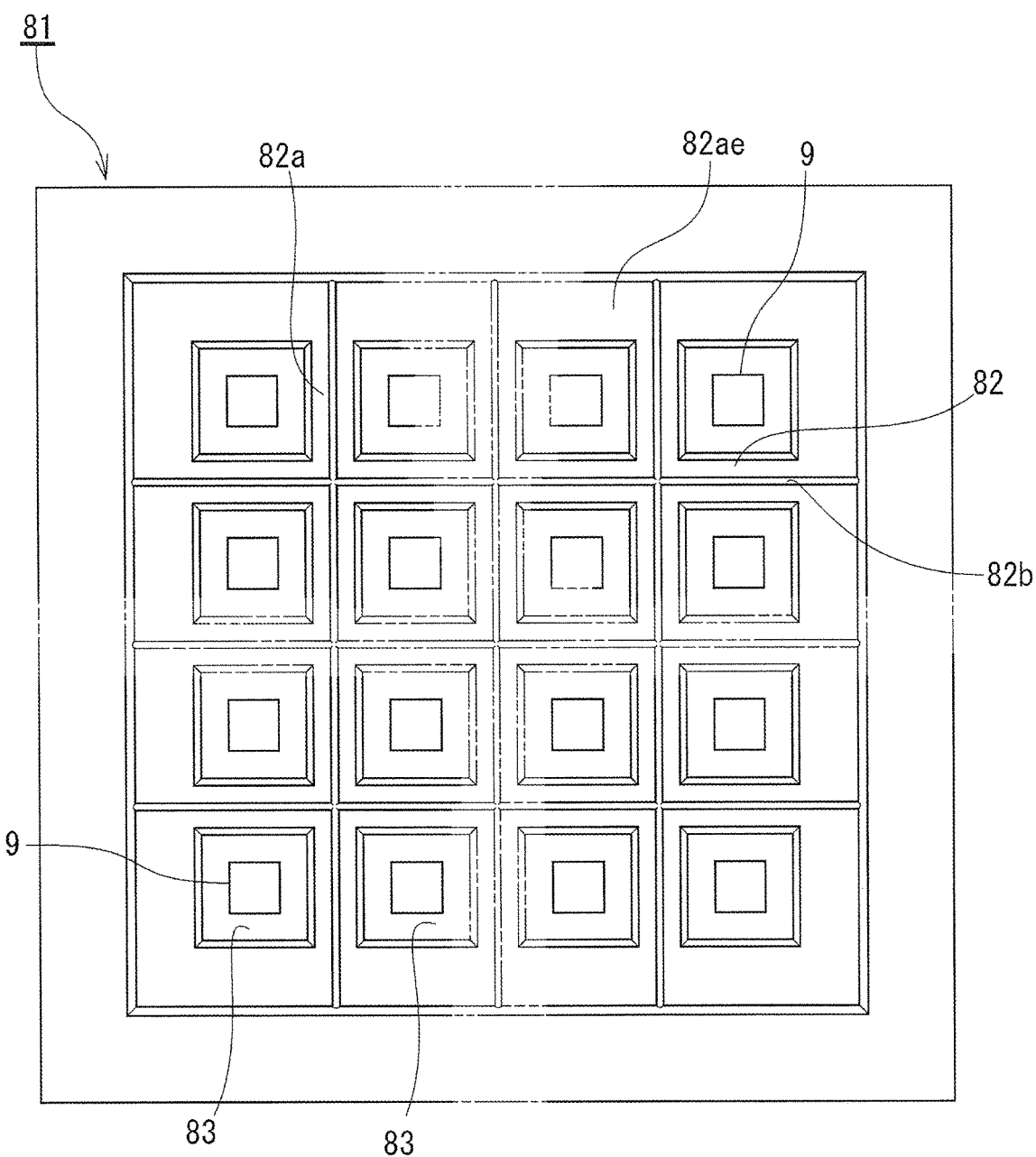
FIG. 11 is a plan view of a tray of the above collection capsule.

FIG. 10 to FIG. 13 each illustrate a third embodiment of the present invention. The third embodiment is related to a modification of a capsule. As illustrated in FIG. 10, a collection capsule 80 of the third embodiment includes a tray 81, and a covering sheet 85. As illustrated in FIG. 10 and FIG. 11, the tray 81 is provided with a latticed partition wall 82 formed by a plurality of wall parts 82a vertically and horizontally intersecting. This latticed partition wall 82 forms a plurality of capsule inner chambers 83 (internal spaces, recesses) vertically and horizontally aligned. Each capsule inner chamber 83 houses a test workpiece 9. The number of the capsule inner chambers 83 in the collection capsule 80 is not particularly limited, and may be about 100, or may be about 1000.

On an upper end surface of the latticed partition wall 82, trap grooves 82b are formed. Each trap groove 82b linearly extends along the longitudinal direction of a corresponding wall part. At wall parts 82*ae* at an outer periphery of the latticed partition wall 82, the trap grooves 82*b* along the longitudinal direction is not provided. However, the trap grooves 82*b* may be provided also in the outer peripheral wall parts 82*ae* in the longitudinal direction.

The covering sheet 85 covers above the tray 81. The covering sheet 85 is, for example, formed of a thin metal film made of aluminum foil. An adhesive layer 86 made of thermally weldable resin is laminated on a lower surface of the covering sheet 85. In the figure, the thickness of the covering sheet 85 and the thickness of the adhesive layer 86 are exaggerated.

The adhesive layer 86 may coat not the whole surface of the covering sheet 85, but only a part corresponding to the partition wall 82 in the covering sheet 85, in the form of a lattice.

An upper surface part of the tray 81 and the covering sheet 85 configure an openable/closeable part 87.

<Housing Process To Evacuation Process>

In the third embodiment, the test workpiece 9 is put in each capsule inner chamber 83 of the tray 81, and the covering sheet 85 covers the tray 81. A surface, covering the adhesive layer 86, of the covering sheet 85 faces the tray 81. At this stage, the covering sheet 85 covers the tray 81 and does not perform sealing. This tray 81 is housed in a chamber 10, and closes the chamber 10. At this stage, the covering sheet 85 is not closely adhered to the tray 81, and therefore each capsule inner chamber 83 is opened to the inside of the chamber 10. Then, gas inside the chamber 10 is sucked to be exhausted, and a rough vacuum process and a high vacuum process are performed.

<Sealing Process>

When an accumulation process starts, a heating roller (not illustrated) rolls over the whole area of the tray 81 while abutting on the covering sheet 85, so that the adhesive layer 86 is welded to the whole area of the upper end surface of the partition wall 82. Consequently, the respective capsule inner chambers 83 are sealed, and the accumulation process is started. Each capsule inner chamber 83 may be sealed in sequence, or each one group (e.g., one row) of capsule inner chambers 83 may be sealed in sequence. All the capsule inner chambers 83 may be sealed at once.

<Monitoring Process>

Figure 12:
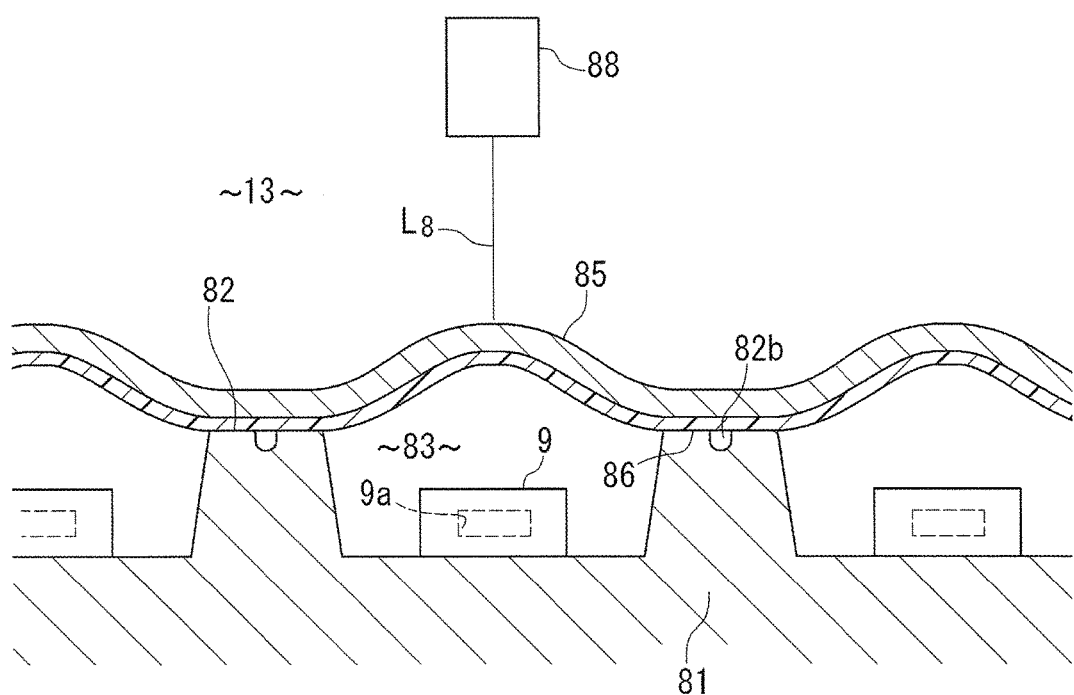
FIG. 12 is an enlarged sectional view illustrating one capsule inner chamber of the above collection capsule in a sealed state.

As illustrated in FIG. 12, when the covering sheet 85 seals the capsule inner chambers 83, gas such as vapor that comes out from inner walls of the capsule inner chambers 83 or outer surfaces of the test workpieces 9 raises the pressure of the capsule inner chambers 83. Therefore, a part, covering each capsule inner chamber 83, of the covering sheet 85 deforms so as to swell upward. Accordingly, the presence or absence of this swelling deformation is detected by a monitor 88, so that the internal pressure of the capsule 80 may be indirectly monitored, and monitor whether or not the capsule inner chambers 83 are reliably sealed. As the monitor 88, an optical sensor or the like that detects the position or the like of an object with a laser beam $L_8$ in non-contact manner is preferably used. It is determined that the capsule inner chamber 83, in which the covering sheet 85 does not swell and deform, has a sealing defect.

Helium originated from the inside of the capsule (including leaked helium from the test workpieces 9) in the respective capsule inner chambers 83 can penetrate the adhesive layer 86 covering the upper surfaces of the capsule inner chambers 83. This penetrated helium travels through the adhesive layer 86 to be captured by the trap grooves 82*b*. Consequently, helium generated in each capsule inner chamber 83 can be prevented from moving to other capsule inner chambers 83. Therefore, it is possible to reliably distinguish the leak amount of each test workpiece 9. Helium hardly penetrate and permeate the covering sheet 85 made of aluminum foil.

<Opening Process>

Figure 13:
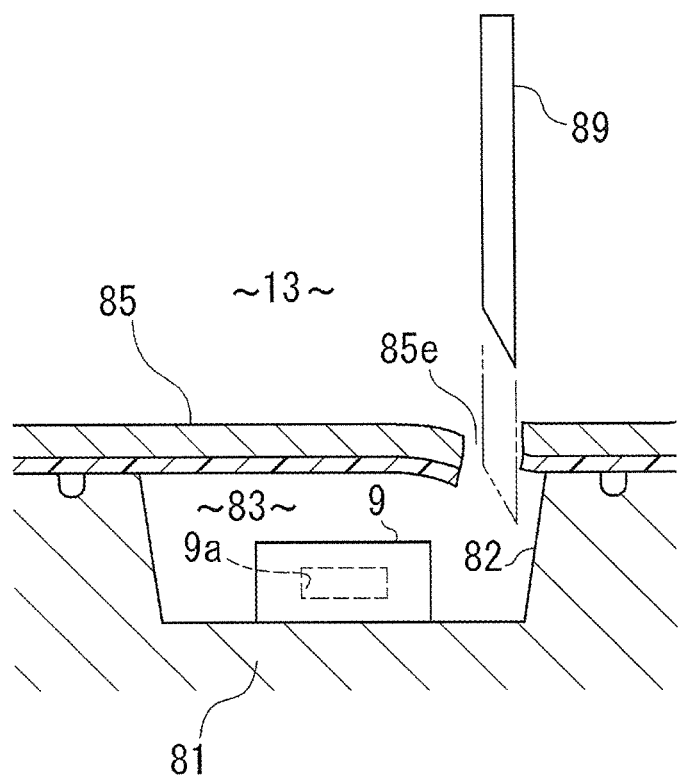
FIG. 13 is a sectional view illustrating a state where the above capsule inner chamber is opened.

As illustrated in FIG. 13, when the accumulation process is terminated, the part, covering each capsule inner chamber 83, of the covering sheet 85 is bored by a boring member 89 such as a cutter. Consequently, the capsule inner chambers 83 are opened to a chamber inside space 13 through bored parts 85*e*. Parts to be bored are preferably corners of the respective capsule inner chambers 83, or parts corresponding to peripheral edges (parts near side surfaces of partition wall 82). Consequently, it is possible to avoid the damage of the test workpiece 9 in each capsule inner chamber 83 by the boring member 89.

The above boring is preferably performed by boring each of the plurality of capsule inner chambers 83 with one interval. Additionally, boring in order of sealing is preferable. Consequently, it is possible to perform leak evaluation while specifying the plurality of test workpieces 9 one by one.

The interval of the above boring is at least $2\tau c$, and preferably at least a measurement time Ti ($=3\tau c$ to $6\tau c$). Consequently, for example, one opening can be performed every 3 seconds. For example, in a case where one thousand test workpieces 9 are housed in the collection capsule 80, an accumulation time Ta is 3000 seconds, and a leak flow rate threshold value is $8 \times 10^{-15}$ Pa m$^3$/s, it is possible to perform the leak determination of the above one thousand test workpieces 9 for about 2 hours.

Other processes, configurations and the like of the third embodiment are similar to those of the first embodiment or the second embodiment. The collection capsule 80 of the third embodiment may be combined with the two-chamber type chamber 10 of the second embodiment. In this case, the collection capsule 80 is housed in the first chamber 11.

Figure 15:
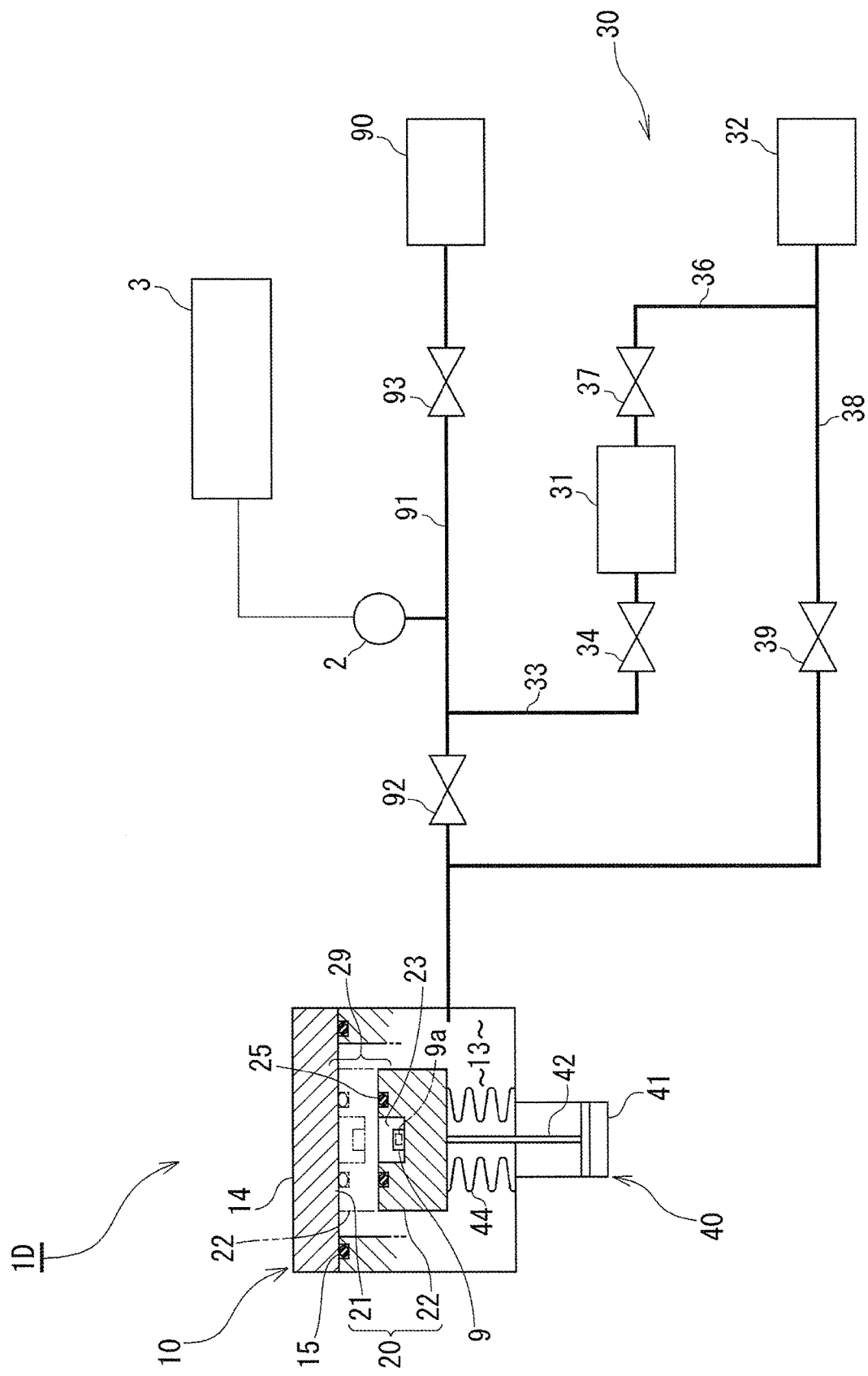
FIG. 15 is a circuit diagram illustrating a schematic configuration of a leak testing apparatus according to a fourth embodiment of the present invention.
Figure 16:
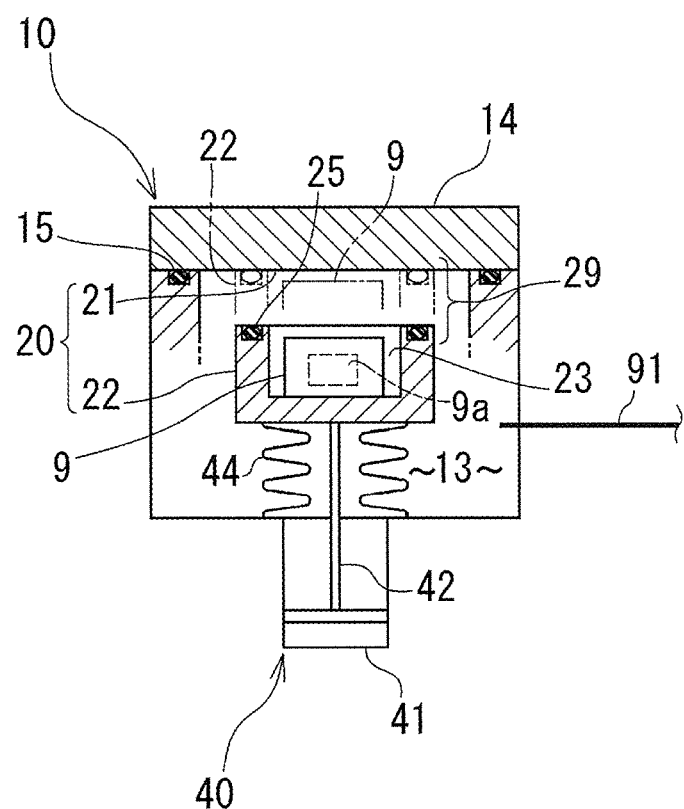
FIG. 16 is a sectional view of a chamber structure in which a capsule in FIG. 15 is exchanged with a capsule corresponding to a test workpiece larger than a test workpiece in FIG. 15, in the leak testing apparatus according to the above fourth embodiment.
Figure 17:
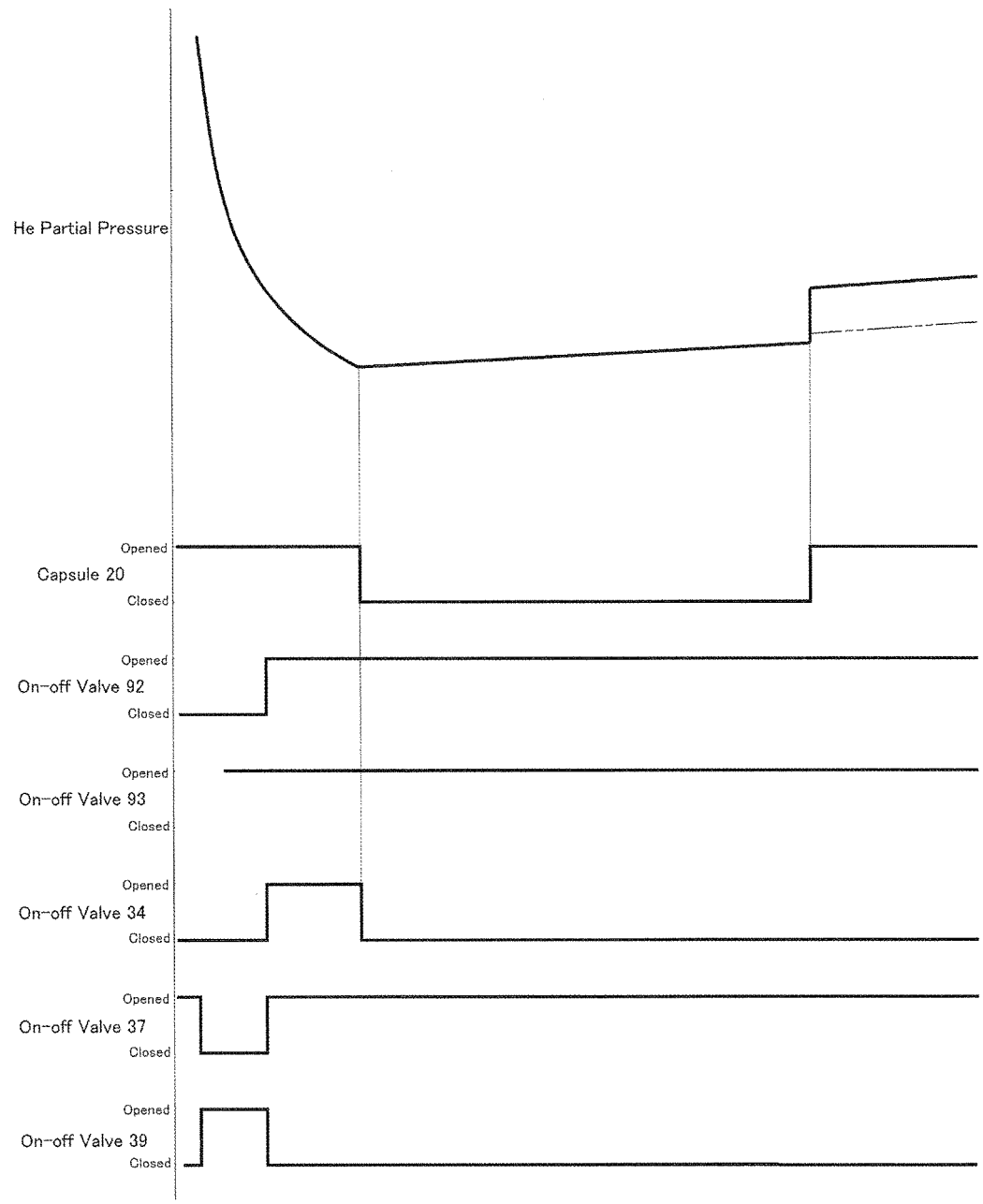
FIG. 17 is a time chart illustrating an example of leak testing operation by the leak testing apparatus according to the above fourth embodiment.

FIG. 15 to FIG. 17 each illustrate a fourth embodiment of the present invention. As illustrated in FIG. 15, in a leak testing apparatus 1D of the fourth embodiment, a chamber 10 is formed in a shape of a container having an open upper surface part. In the upper surface part of the chamber 10, a taking-in/out door 14 is openably provided. A capsule lower part 22 is disposed inside the chamber 10. The capsule lower part 22 is liftably supported by a driving cylinder 41 of capsule opener/closer 40. A recess is formed in an upper surface of the capsule lower part 22. This recess becomes a capsule inner chamber 23.

The taking-in/out door 14 is closed, the capsule lower part 22 is raised by the driving cylinder 41, and the upper surface of the capsule lower part 22 abuts on a lower surface of the taking-in/out door 14, so that the capsule inner chamber 23 is sealed. The taking-in/out door 14 of the chamber 10 serves also as a capsule upper part 21 of a capsule 20. Additionally, the taking-in/out door 14, that is, a lower surface part (one part) of the capsule upper part 21 and the upper surface part of the capsule lower part 22 configure an openable/closeable part 29.

As illustrated in FIG. 15 and FIG. 16, the capsule lower part 22 of the leak testing apparatus 1D can exchanged in accordance with the size of the test workpiece 9. That is, in the leak testing apparatus 1D, the small capsule lower part 22 (FIG. 15) of the capsule inner chamber 23, and the large capsule lower part 22 (FIG. 16) of the capsule inner chamber 23 are prepared. The inner capacity of the capsule 20 is preferably at most one fifth of the inner capacity of the chamber 10, and is more preferably at most one hundredth of the inner capacity of the chamber 10, and is further more preferably one thousandth of the inner capacity of the chamber 10.

Although illustration is omitted, the capsule 20 may be provided with a pressure monitor 6.

The chamber 10 may be provided with a pressure sensor 4.

A plurality of the capsule lower parts 22 may be provided in the chamber 10, thereby configuring a collection capsule. The driving cylinder 41 may be provided for each capsule lower part 22.

As illustrated in FIG. 15, a cryopump 90 is connected to the chamber 10 through an inspection passage 91. The cryopump 90 has an extremely low temperature part whose absolute temperature is, for example, about 20 K. This extremely low temperature part adsorbs and removes gas other than helium inside the inspection passage 91 and the chamber 10.

A mass spectrometer 2 is provided in a middle part of the inspection passage 91. The mass spectrometer 2 detects helium partial pressure in the inspection passage 91 and helium partial pressure in the chamber 10. On-off valves 92 and 93 are provided at the front and the back of the mass spectrometer 2 in the inspection passage 91. Additionally, exhaust passages 38 and 33 are branched from the front and the back of the on-off valve 92 in the inspection passage 91, respectively. The exhaust passage 33 is connected to an inlet port of a turbo molecular pump 31 (vacuum pump). An exhaust passage 36 extends from an outlet port of the turbo molecular pump 31. The exhaust passage 36 and the exhaust passage 38 are joined to each other to be connected to a rotary pump 32 (roughing pump). The respective exhaust passages 33, 36 and 38 are provided with on-off valves 34, 37 and 39.

An example of a leak inspection method by the leak testing apparatus 1D of the fourth embodiment is described in reference to the time chart of FIG. 17.

<Housing Process>

In a state where the on-off valves 92 and 39 are closed, the taking-in/out door 14 is opened, and a test workpiece 9 after bombing is housed in the capsule inner chamber 23. Then, the taking-in/out door 14 is closed. Consequently, a chamber inside space 13 is sealed. At this stage, the capsule 20 is separated below the taking-in/out door 14, and the capsule inner chamber 23 is communicated with the chamber inside space 13.

<Vacuum Suction Process>

Then, the on-off valve 39 is opened, so that gas in the chamber inside space 13 and gas in the capsule inner chamber 23 are roughly vacuumed by the rotary pump 32.

Before the rough vacuum by the rotary pump 32 is terminated, the on-off valve 93 is opened, and the turbo molecular pump 31 exhausts helium inside the cryopump 90 up to predetermined pressure (partial pressure) or less.

Then, the on-off valve 39 is closed, and the on-off valves 92, 34 and 37 are opened, the turbo molecular pump 31 and the cryopump 90 further vacuum-suck gas in the chamber inside space 13 and gas in the capsule inner chamber 23.

<Capsule Sealing Process>

When the helium partial pressure of the chamber inside space 13, that is, the helium partial pressure of the capsule inner chamber 23 reaches a desired value, the driving cylinder 41 raises the capsule lower part 22 to make the capsule lower part 22 abut on the taking-in/out door 14. Consequently, the capsule inner chamber 23 is sealed. Almost at the same time as the sealing of the capsule inner chamber 23, the on-off valve 34 is closed, and the vacuum suction of the chamber 10 by the turbo molecular pump 31 is stopped. Consequently, the chamber 10 is also sealed. At this time, in each of the chamber 10 and the capsule inner chamber 23, helium is confined at the same partial pressure.

<Accumulation Process>

Consequently, the accumulation process is started, background helium BG2 originated from the inside of the capsule from an inner wall of the capsule 20, an outer surface of the test workpiece 9, and the like, and leaked helium from an internal space 9a of the test workpiece 9 are accumulated in the capsule inner chamber 23.

<Background Originated From Outside Of Capsule>

During the accumulation process, background helium BG1 originated from the outside of the capsule is liberated from an inner wall of the chamber 10, an outer wall of the capsule 20, and the like to the chamber inside space 13. The helium partial pressure of the chamber inside space 13 gradually increases by the amount of this background helium BG1. Gas in the chamber inside space 13 diffuses in the inspection passage 91, and further diffuses to the cryopump 90. Gas other helium in this gas component is exhausted by the cryopump 90. On the other hand, the cryopump 90 does not exhaust helium. Therefore, the helium partial pressure of the inside of the inspection passage 91, the helium partial pressure of the inside of the cryopump 90, and the helium partial pressure of the inside of the mass spectrometer 2 are equal to the helium partial pressure of the chamber inside space 13. The inside of the inspection passage 91, the inside of the cryopump 90, and the inside of the mass spectrometer 2 can be regarded as a part of the chamber inside space 13.

<Capsule Opening Process>

After the accumulation time is terminated, the driving cylinder 41 descends the capsule lower part 22 to separate the capsule lower part 22 from the taking-in/out door 14. Consequently, the capsule inner chamber 23 is opened to be communicated with the chamber inside space 13. Therefore helium accumulated in the capsule inner chamber 23 during the accumulation process diffuses to the chamber inside space 13. Consequently, the helium partial pressure of the chamber inside space 13 discontinuously rises or changes (increases/reduces).

<Detecting Process>

This helium partial pressure is detected by the mass spectrometer 2. The larger the gas amount accumulated in the capsule inner chamber 23 during the accumulation process is, the more largely the detection value of the helium partial pressure is increased by the opening of the capsule inner chamber 23. In a case where the gas amount in the capsule inner chamber 23 hardly increases from the early stage of the accumulation, change (increase/decrease) in the detection value of the helium partial pressure is small.

For example, as illustrated by the two-dot chain line of the chart of "He partial pressure" in FIG. 17, when the test workpiece 9 is a good product having no-leak, the helium partial pressure rises by the accumulated amount of background helium BG2 originated from the inside of the capsule from the inner wall of the capsule inner chamber 23, the outer surface of the test workpiece 9, and the like, when the capsule 20 is opened. The rising degree of this helium partial pressure is small.

On the other hand, in a case where the test workpiece 9 is a defective product having a leak, not only the background helium BG2 originated from the inside of the capsule, but also helium that leaks from the internal space 9a of the test workpiece 9 to be accumulated diffuse to the chamber inside space 13 by the opening of the capsule 20. Therefore, as illustrated by the solid line of the chart of "He partial pressure" in FIG. 17, in a case where the test workpiece 9 is a defective product having a leak, the helium partial pressure of the chamber inside space 13 is larger than the helium partial pressure in a case where the test workpiece 9 is a good product, and discontinuously rises with the opening of the capsule 20.

<Evaluation Process>

The detection information of the helium partial pressure by the mass spectrometer 2 is input to an evaluator 3. The evaluator 3 reads the degree of the change in partial pressure detected when the capsule 20 is opened. Consequently, it is possible to determine (evaluate) the existence or non-existence or the level of the leak of the test workpiece 9.

The gas amount accumulated in the capsule inner chamber 23 during the accumulation process can be obtained by arithmetic operation from the capacity of the capsule inner chamber 23, the capacity of the chamber inside space 13, helium partial pressure before the accumulation, and helium partial pressure before and after the opening of the capsule inner chamber 23. Herein, the capacity of the capsule inner chamber 23, and the capacity of the chamber inside space 13 can be handled as known information. Additionally, the helium partial pressure before the accumulation, and the helium partial pressure before and after the opening of the capsule inner chamber 23 can be detected by the mass spectrometer 2. Consequently, only the gas amount of helium originated from the inside of the capsule including the test workpiece 9 can be precisely evaluated while being distinguished from helium gas amount originated from the outside of the capsule from the inner wall of the chamber and the like.

The test workpiece 9 is not directly placed inside the chamber 10, and the test workpiece 9 is housed in the capsule 20, and therefore a plurality sets of the capsule lower parts 22 and the driving cylinders 41 can be provided inside the chamber 10. The test workpiece 9 is housed in each of the capsule inner chambers 23 of the capsule lower parts 22, and an accumulation process is performed at the same time. Thereafter, the capsule lower parts 22 are descended in sequence one by one, so that the capsule inner chambers 23 are opened in sequence one by one, and helium partial pressure is detected. Consequently, it is possible to improve throughput.

The present invention is not limited to the above embodiments, and various modifications and changes are possible without departing from the spirit of the present invention.

For example, in the first embodiment and the like, the helium flow rate in the determination process before accumulation or the accumulation process is $10^{-9}$ Pa m$^3$/s to $10^{-10}$ Pa m$^3$/s. However, when the helium flow rate exceeds the above helium flow rate, the determination process before accumulation or the accumulation process may be started depending on the operating condition.

The present invention is not limited to the numeral values of the above embodiments.

According the capsule 20, when the taking-in/out door 14 (or the lid 24) of the chamber 10 is closed, at least the openable/closeable part 29 (particularly, outer peripheral part of the O-ring 25) should be within the chamber 10. The place where the capsule 20 is disposed is not particularly limited. The capsule 20 may be placed within the chamber 10 without being fixed. The whole of the capsule 20 is most preferably placed within the chamber 10. The placement of the collection capsule 80 is similar to the placement of the capsule 20.

A load lock chamber is added to the outside of the taking-in/out door 14 of the chamber 10, so that the exchange of the test workpiece 9 may be performed by a load lock type. That is, in a state where the taking-in/out door 14 is closed, and the chamber 10 is sealed, the load lock chamber is made to become atmospheric pressure along with the leak testing of the test workpiece 9 in the capsule 20, and a test workpiece 9 to be tested in a next time is housed in this load lock chamber. Then, the load lock chamber is evacuated in the same degree as the inside of the chamber 10. When the leak testing of one test workpiece 9 is terminated, the taking-in/out door 14 is opened, the test workpiece 9 inside the capsule 20 obtained after the leak testing is taken out to be moved to the load lock chamber, and the test workpiece 9 in the load lock chamber is moved into the capsule 20, by the manipulator provided in the load lock chamber or the chamber 10. Then, the taking-in/out door 14 is closed. Then, nitrogen gas or dry air is introduced in the load lock chamber, and the chamber pressure of the load lock chamber is made to become atmospheric pressure. Then, the above test workpiece 9 after the leak testing is taken out from the load lock chamber. Consequently, it is possible to avoid the direct exposure of the capsule 20 to atmosphere in the exchange of the test workpiece 9, and it is possible to reduce background helium BG2 and impurity gas originated from the inside of the capsule.

A plurality of the test workpieces 9 may be put in the one capsule inner chamber 23 at once, and the leak testing of these plurality of test workpieces 9 may be collectively performed. In this case, when the leak is confirmed, all of these plurality of test workpieces 9 are handled as airtightness failure once. Consequently, it is possible to increase the number of the test workpiece 9 for which the leak testing can be performed per hour. In a case where it is determined as the airtightness failure, the leak testing of the individual test workpiece 9 may be performed again as needed.

A plurality of the capsules 20 may be provided in the one chamber 10, and multi-channel may be attained. The capsule 20 of each channel is closed in sequence by mechanical capsule opener/closer 40. When the accumulation time Ta elapses, the capsule 20 of each channel is opened, so that it may be determined at which level each test workpiece 9 (or test workpiece group) leaks. The capsule 20 of each channel may be opened in a closed order. When the flow rate Qr of the helium originated from the inside of the capsule is calculated in the evaluation process in accordance with Expression (9), the accumulation time Ta in the same expression may be changed in accordance with the opening timing of the test workpiece 9.

The inner surface of the capsule 20 is previously subjected to water repellent treatment, so that a moisture adhesion amount may be reduced. Additionally, when testing time is enough, and there is no problem in the heat-resisting property of the test workpiece 9, the capsule 20, particularly, the inner wall part of the capsule 20, or the test workpiece 9 is previously heated to, for example, 70° or more, so that a degas process (background BG2 or impurity gas reduction process) may be performed. The wall thickness of the capsule 20 can be reduced, so that heat capacity can be reduced, and therefore it is possible to perform heating and subsequent cooling for a short time. The capsule 20 housing the test workpiece 9 is provided independently from the chamber 10, so that a heating mechanism can be provided only in the capsule 20. The capsule 20 is not cooled during the accumulation or is not provided with a cooling unit, and therefore the density of accumulated gas related to measurement depends only on a room temperature. Therefore, it is not necessary to consider a change in gas density which is changed by heat transmission of the cooling unit.

The collection capsule 80 is similar to the capsule 20.

Power is hardly applied to the throttle 35 during flow rate measurement, and therefore in order to accelerate exhaust from the chamber 10, a throttle for an optical system device (such as a camera) whose throttle function is enabled only during the measurement of a helium flow rate, and is opened to be disabled when the measurement of the helium flow rate is not needed may be used.

As an alternative mode in which the measurement helium gas amount (time integration amount) QIt contributes to leak evaluation is applied, a leak may be evaluated on the basis of the measurement helium gas amount QIt. The leak may be evaluated on the basis of the gas amount QIr of helium originated from the inside of the capsule, which is calculated from the measurement helium gas amount QIt.

Figure 14:
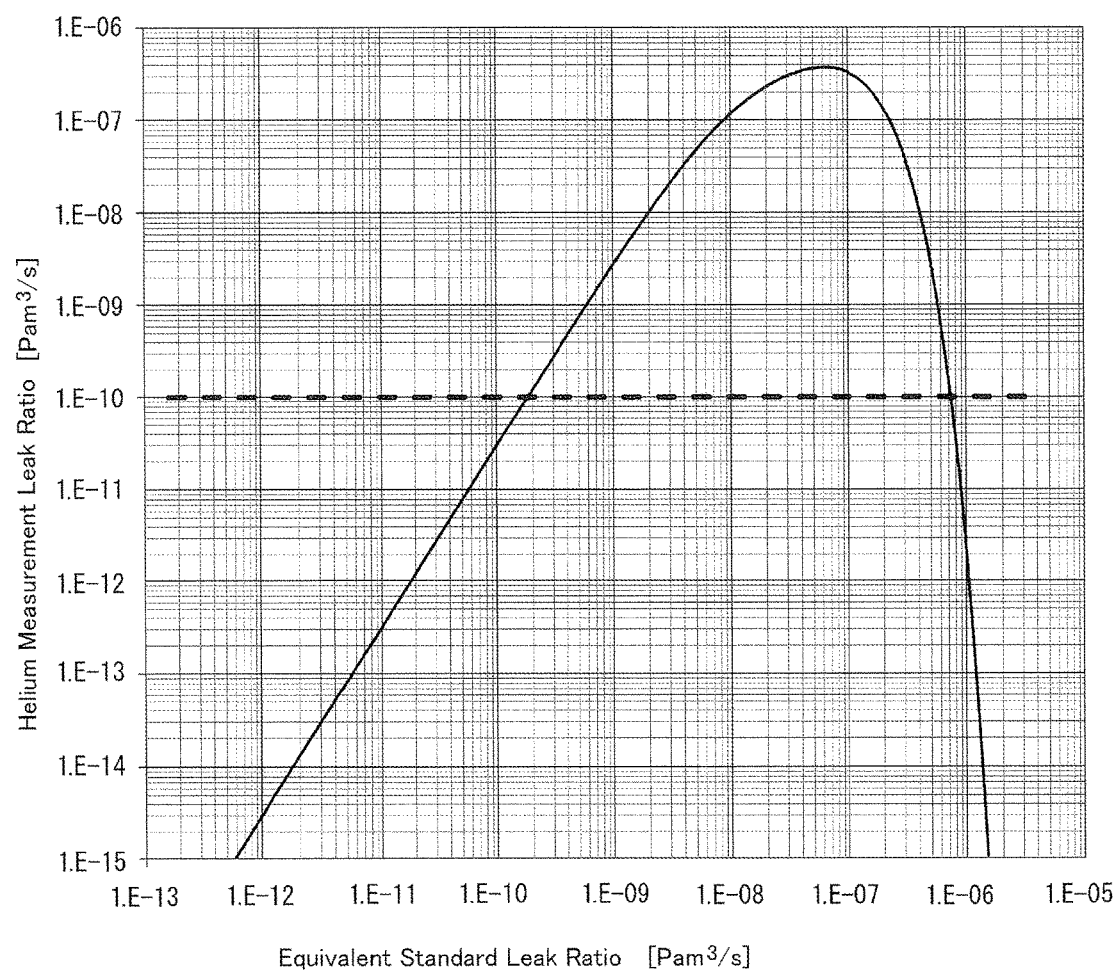
FIG. 14 is a graph illustrating an example of a relation between a helium measurement leak ratio and an equivalent standard leak ratio in a helium dipping method.

Although it is assumed that the present apparatus and method each are helium immersion (bombing) to a test workpiece, it should be noted that it is difficult to find a large leak (a large leak or a small leak) by the helium immersion. For example, when a helium leak flow rate is measured within 10 minutes, after helium bombing of 6 atm (absolute pressure) is performed to an MEMS package having inner capacity of 1 mm$^3$ as the test workpiece 9 for 2 hours, a relation between the helium leak flow rate and the equivalent standard leak ratio is a relation shown in FIG. 14, in accordance with the JIS C 60068-2-17 annex D method. As illustrated in FIG. 14, when the helium leak flow rate (leak rate) can be measured up to $10^{-10}$ Pa m$^3$/s by a conventional dipping method, leak determination of $2\times10^{-10}$ Pa m$^3$/s to $7\times10^{-7}$ Pa m$^3$/s is possible at an air conversion equivalent standard leak ratio. However a leak of $7\times10^{-7}$ P am$^3$/s or more at the equivalent standard leak ratio cannot be measured, because helium is released after the bombing and before the measurement. Therefore, it is preferable that leak testing is previously or separately performed to the large leak to the small leak ($10^{-7}$ Pa m$^3$/s or more) in the region by an air leak tester or the like.

Furthermore, although it is assumed that the present apparatus and method each are helium immersion (bombing) to a test workpiece, it is of course that the leak testing can be performed also to a test workpiece previously sealed with helium.

The inspection gas is not limited to helium, and may be gas other than helium such as hydrogen.

The evacuation of the chamber 10 may be temporarily stopped during the period of the accumulation process.

In the estimation process for estimating the gas amount QIe of helium BG1 originated from the outside of the capsule included in measurement helium gas amount (time integration amount) QIt within the measurement time Ti by the mass spectrometer 2, the length of the estimated time Te at the end stage of the accumulation process may be made not to be the same as the measurement time Ti (Te≠ Ti), and may be made to be longer than the measurement time Ti (Te>Ti) to estimate the gas amount QIe in the measurement time Ti.

The original configurations of at least two embodiments may be combined. For example, also in the first embodiment, the inner capacity of the chamber 10 may be about 5 times to about 100 times the inner capacity of the capsule 20. Also in the first embodiment, the capsule 20 may be exchanged in accordance with the size of the test workpiece 9 similarly to the fourth embodiment.

In the collection capsule configuration of the third embodiment (FIG. 10 to FIG. 13), leak evaluation may be performed by the helium partial pressure detection method of the fourth embodiment.

In the fourth embodiment (FIG. 15 to FIG. 17), the detector 2 may be provided within the chamber 10, and helium partial pressure inside the chamber 10 may be directly detected.

In the fourth embodiment (FIG. 15 to FIG. 17), after the capsule 20 is closed, the on-off valve 34 may be temporarily opened before the opening of the capsule 20, and the turbo molecular pump 31 may vacuum-suck gas in the chamber inside space 13.

INDUSTRIAL APPLICABILITY

The present invention is applicable for, for example, determining the quality of the sealing property of a micro-sized precision article such as a quartz oscillator and an MEMS.

REFERENCE SIGNS LIST

1, 1B, 1D Leak testing apparatus
2 Mass spectrometer (detector)
3 Control arithmetic processing unit (evaluator)
6 Monitor
9 Test workpiece 9a Internal space
10 Chamber
11 First chamber
12 Second chamber
14 Taking-in/out door
16 Gate valve (partition)
20 Capsule
23 Capsule inner chamber (internal space, recess)
24 Lid (taking-in/out door)
29 Openable/closeable part
30 Evaluator
31 Turbo molecular pump (vacuum pump)
40 Capsule opener/closer
80 Collection capsule (capsule)
83 Capsule inner chamber (internal space, recess)
85 Covering sheet
88 Optical sensor (monitor)
QIt Measurement helium gas amount (time integration amount)
QIe Gas estimation amount of helium originated from outside of capsule
QIr Gas amount of helium originated from inside of capsule (amount of inspection gas originated from inside of capsule)
Qr Flow rate of helium originated from inside of capsule (flow rate of inspection gas originated from inside of capsule)
Ta Accumulation time
Ti Measurement time

The invention claimed is:

1. A leak testing apparatus for testing a leak of inspection gas from a test workpiece having an internal space, the leak testing apparatus comprising:
   a capsule that has an openable/closeable part, and houses the test workpiece;
   a chamber that has a larger inner capacity than an inner capacity of the capsule, and houses at least the openable/closeable part of the capsule;
   a vacuum pump that evacuates gas inside the chamber;

a detector that detects the inspection gas from the chamber or the inspection gas in the chamber;

a capsule opener/closer that provides for closing the openable/closeable part at a certain stage of the evacuation to continuously seal the capsule for an accumulation time, and provides for opening the openable/closeable part to open inside of the capsule to inside of the chamber after the accumulation time elapses; and an evaluator that evaluates the leak on the basis of detection information by the detector.

2. The leak testing apparatus according to claim 1, wherein the inner capacity of the chamber is at least 5 times the inner capacity of the capsule.

3. The leak testing apparatus according to claim 1, wherein the inner capacity of the chamber is at least 100 times the inner capacity of the capsule.

4. The leak testing apparatus according to claim 1, wherein the detector detects a flow rate of the inspection gas contained in the evacuated gas, and the evaluator calculates a time integration amount of a detected flow rate by the detector over a measurement time after the opening of the openable/closeable part.

5. The leak testing apparatus according to claim 4, wherein a time constant $\tau c$ of the evacuation is not less than 0.1 seconds and not more than 1 second, wherein the time constant $\tau c$ is expressed as:

$$\tau c = V/C$$

where $V$ ($m^3$) is the inner capacity of the chamber and $C$ ($m^3/s$) is conductance of the inspection gas contained in the evacuated gas conducted from the chamber.

6. The leak testing apparatus according to claim 4, wherein the evaluator estimates an amount of inspection gas originated from a place other than the inside of the capsule, which is included in the time integration amount, from a detected flow rate by the detector during the accumulation time, and evaluates the leak on the basis of an amount of inspection gas originated from the inside of the capsule, which is obtained by deducting the estimated gas amount from the time integration amount, and a flow rate of the inspection gas originated from the inside of the capsule, which is calculated from the accumulation time and the measurement time.

7. The leak testing apparatus according to claim 4, wherein the chamber is provided with a partition that is displaceable between a block position for partitioning the inside of the chamber into a first chamber and a second chamber larger than the first chamber, and a communication position for communicating the first and second chambers, the first chamber houses the capsule, and the second chamber is continued to the vacuum pump, and the partition is put at the block position when the test workpiece is taken in/out, and the partition is put at the communication position during the accumulation time and the measurement time.

8. The leak testing apparatus according to claim 1, wherein the evacuation of the chamber by the vacuum pump is stopped during the opening of the openable/closeable part, the detector detects partial pressure of the inspection gas, and the evaluator evaluates the leak on the basis of a degree of a change of the partial pressure associated with the opening of the openable/closeable part.

9. The leak testing apparatus according to claim 1, further comprising a monitor that monitors internal pressure of the capsule.

10. A leak testing apparatus for testing a leak of inspection gas from a test workpiece having an internal space, the leak testing apparatus comprising:

a collection capsule having a plurality of recesses for housing respective test workpieces, and an openable/closeable part of the recesses, each of the plurality of recesses configuring the internal space of the capsule;

a chamber that has a larger inner capacity than an inner capacity of the capsule, wherein at least the openable/closeable part of the collection capsule is housed inside the chamber;

a vacuum pump that evacuates gas inside the chamber;

a detector that detects the inspection gas from the chamber or the inspection gas in the chamber;

a capsule opener/closer that provides for closing the openable/closeable part at a certain stage of the evacuation to continuously seal the capsule for an accumulation time, and provides for opening the openable/closeable part to open inside of the capsule to inside of the chamber after the accumulation time elapses; and an evaluator that evaluates the leak on the basis of detection information by the detector.

11. A leak testing method for testing a leak of inspection gas from a test workpiece having an internal space, the leak testing method comprising the steps of:

housing the test workpiece in a capsule having an openable/closeable part;

housing at least the openable/closeable part of the capsule in a chamber having a larger inner capacity than an inner capacity of the capsule;

evacuating gas inside the chamber by a vacuum pump;

detecting the inspection gas from the chamber or the inspection gas in the chamber by a detector;

closing the openable/closeable part at a certain stage of the evacuation to continuously seal the capsule for an accumulation time;

opening the openable/closeable part to open inside of the capsule to inside of the chamber after the accumulation time elapses; and evaluating the leak on the basis of detection information by the detector.

12. The leak testing method according to claim 11, wherein the step of detecting includes detecting a flow rate of the inspection gas contained in the evacuated gas by the detector, wherein the method further includes a step of calculating a time integration amount of the detected flow rate by the detector over a measurement time after the opening of the openable/closeable part, and wherein the step of evaluating includes evaluating the leak on the basis of the time integration amount.

13. The leak testing method according to claim 12, wherein the method further includes a step of estimating an amount of inspection gas originated from a place other than the inside of the capsule, which is included in the time integration amount from a detected flow rate by the detector during the accumulation time, and wherein the step of evaluating includes evaluating the leak on the basis of an amount of inspection gas originated from the inside of the capsule, which is obtained by deducting the estimated gas amount from the time integration amount, and a flow rate of the inspection gas originated from the inside of the capsule, which is calculated from the accumulation time and the measurement time.

14. The leak testing method according to claim 13, wherein a time constant $\tau c$ of the evacuation of the inspection gas is not less than 0.1 seconds and not more than 1 second and the measurement time is at least 3 times and at most 6 times the time constant of the evacuation of the inspection gas, wherein the time constant τc is expressed as:

$$\tau c = V/C$$

where V (m³) is the inner capacity of the chamber and C (m³/s) is the conductance of the inspection gas contained in the evacuated gas conducted from the chamber.

15. The leak testing method according to claim 13, wherein the method further includes a step of monitoring a sealing condition of the capsule by monitoring the internal pressure of the capsule during the accumulation time.

16. The leak testing method according to claim 12, wherein a time constant τc of the evacuation of the inspection gas is not less than 0.1 seconds and not more than 1 second, wherein the time constant τc is expressed as:

$$\tau c = V/C$$

where V (m³) is the inner capacity of the chamber and C (m³/s) is the conductance of the inspection gas contained in the evacuated gas conducted from the chamber.

17. The leak testing method according to claim 16, wherein the measurement time is at least 3 times and at most 6 times the time constant of the evacuation of the inspection gas.

18. The leak testing method according to claim 11, wherein the method further includes a step of stopping the evacuation of the chamber by the vacuum pump during the opening of the openable/closeable part, wherein the step of detecting includes detecting partial pressure of the inspection gas in the chamber by the detector, and wherein the step of evaluating includes evaluating the leak on the basis of a degree of a change in the partial pressure associated with the opening of the openable/closeable part.

19. The leak testing method according to claim 18, wherein the method further includes a step of monitoring a sealing condition of the capsule by monitoring the internal pressure of the capsule during the accumulation time.

20. The leak testing method according to claim 11, wherein the method further includes a step of monitoring a sealing condition of the capsule by internal pressure of the capsule during the accumulation time.

* * * * *